United States Patent
Lin et al.

(10) Patent No.: US 12,367,561 B2
(45) Date of Patent: Jul. 22, 2025

(54) GENERATING AND PROVIDING A PANOPTIC INPAINTING INTERFACE FOR GENERATING AND MODIFYING INPAINTED DIGITAL IMAGES

(71) Applicant: Adobe Inc., San Jose, CA (US)

(72) Inventors: Zhe Lin, Fremont, CA (US); Haitian Zheng, Rochester, NY (US); Elya Shechtman, Seattle, WA (US); Jianming Zhang, Campbell, CA (US); Jingwan Lu, Santa Clara, CA (US); Ning Xu, Milpitas, CA (US); Qing Liu, Santa Clara, CA (US); Scott Cohen, Sunnyvale, CA (US); Sohrab Amirghodsi, Seattle, WA (US)

(73) Assignee: Adobe Inc., San Jose, CA (US)

( * ) Notice: Subject to any disclaimer, the term of this patent is extended or adjusted under 35 U.S.C. 154(b) by 436 days.

(21) Appl. No.: 17/937,706

(22) Filed: Oct. 3, 2022

(65) Prior Publication Data

US 2024/0127411 A1 Apr. 18, 2024

(51) Int. Cl.
*G06T 5/77* (2024.01)
*G06T 7/11* (2017.01)

(52) U.S. Cl.
CPC .............. *G06T 5/77* (2024.01); *G06T 7/11* (2017.01); *G06T 2200/24* (2013.01); *G06T 2207/20081* (2013.01); *G06T 2207/20084* (2013.01)

(58) Field of Classification Search
CPC ......... G06T 5/77; G06T 7/11; G06T 2200/24; G06T 2207/20081; G06T 2207/20084

(Continued)

(56) References Cited

U.S. PATENT DOCUMENTS 10,922,793 B2  2/2021  Baek et al.
12,159,412 B2  12/2024 Ben Baruch et al.
(Continued)

FOREIGN PATENT DOCUMENTS

CN  111556278 A  8/2020
CN  115205161 A  10/2022
GB    2619381 A  12/2023

OTHER PUBLICATIONS

Uijlings, Jasper RR, Mykhaylo Andriluka, and Vittorio Ferrari. "Panoptic image annotation with a collaborative assistant." Proceedings of the 28th ACM international conference on multimedia. 2020. (Year: 2020).*

(Continued)

*Primary Examiner* — Jonathan S Lee
(74) *Attorney, Agent, or Firm* — Keller Preece PLLC

(57) ABSTRACT

The present disclosure relates to systems, methods, and non-transitory computer readable media for panoptically guiding digital image inpainting utilizing a panoptic inpainting neural network. In some embodiments, the disclosed systems utilize a panoptic inpainting neural network to generate an inpainted digital image according to panoptic segmentation map that defines pixel regions corresponding to different panoptic labels. In some cases, the disclosed systems train a neural network utilizing a semantic discriminator that facilitates generation of digital images that are realistic while also conforming to a semantic segmentation. The disclosed systems generate and provide a panoptic inpainting interface to facilitate user interaction for inpainting digital images. In certain embodiments, the disclosed systems iteratively update an inpainted digital image based on changes to a panoptic segmentation map.

20 Claims, 26 Drawing Sheets

(58) Field of Classification Search
USPC .......................................................... 382/275
See application file for complete search history.

(56) References Cited

U.S. PATENT DOCUMENTS

| | | | |
|---|---|---|---|
| 2019/0196698 | A1 | 6/2019 | Cohen et al. |
| 2020/0242774 | A1 | 7/2020 | Park et al. |
| 2020/0405242 | A1 | 12/2020 | Kearney et al. |
| 2021/0097691 | A1 | 4/2021 | Liu |
| 2021/0118099 | A1 | 4/2021 | Kearney et al. |
| 2021/0158043 | A1 | 5/2021 | Hou et al. |
| 2021/0158491 | A1 | 5/2021 | Li et al. |
| 2021/0342983 | A1 | 11/2021 | Lin et al. |
| 2021/0357684 | A1 | 11/2021 | Amirghodsi et al. |
| 2022/0129682 | A1 | 4/2022 | Tang et al. |
| 2022/0172369 | A1 | 6/2022 | Tang et al. |
| 2022/0366544 | A1 | 11/2022 | Kudelski et al. |
| 2023/0368339 | A1 | 11/2023 | Zheng et al. |
| 2024/0013351 | A1 | 1/2024 | Liu |

OTHER PUBLICATIONS

Zhu, Hu, et al. "Fusing panoptic segmentation and geometry information for robust visual slam in dynamic environments." 2022 IEEE 18th International Conference on Automation Science and Engineering (CASE). IEEE, 2022. (Year: 2022).*

Bescos, Berta, et al. "DynaSLAM: Tracking, mapping, and inpainting in dynamic scenes." IEEE robotics and automation letters 3.4 (2018): 4076-4083. (Year: 2018).*

Pathak, Deepak, et al. "Context encoders: Feature learning by inpainting." Proceedings of the IEEE conference on computer vision and pattern recognition. 2016. (Year: 2016).*

Jean-François Aujol, Guy Gilboa, Tony Chan, and Stanley Osher. 2006. Structure-Texture Image Decomposition—Modeling, Algorithms, and Parameter Selection. International journal of computer vision 67, 1 (2006), 111-136.

Coloma Ballester, Marcelo Bertalmio, Vicent Caselles, Guillermo Sapiro, and Joan Verdera. 2001. Filling-in by joint interpolation of vector fields and gray levels. IEEE transactions on image processing 10, 8 (2001), 1200-1211.

Connelly Barnes, Eli Shechtman, Adam Finkelstein, and Dan B Goldman. 2009. PatchMatch: A randomized correspondence algorithm for structural image editing. ACM Trans. Graph. 28, 3 (2009), 24.

David Bau, Jun-Yan Zhu, Hendrik Strobelt, Agata Lapedriza, Bolei Zhou, and Antonio Torralba. 2020. Understanding the role of individual units in a deep neural network. Proceedings of the National Academy of Sciences 117, 48 (2020), 30071-30078.

Marcelo Bertalmio, Luminita Vese, Guillermo Sapiro, and Stanley Osher. 2003. Simultaneous structure and texture image inpainting. IEEE transactions on image processing 12, 8 (2003), 882-889.

Tony F Chan and Jianhong Shen. 2001. Nontexture inpainting by curvature-driven diffusions. Journal of visual communication and image representation 12, 4 (2001), 436-449.

Ting Chen, Simon Kornblith, Mohammad Norouzi, and Geoffrey Hinton. 2020. A simple framework for contrastive learning of visual representations. In International conference on machine learning. PMLR, 1597-1607.

Lu Chi, Borui Jiang, and Yadong Mu. 2020. Fast fourier convolution. Advances in Neural Information Processing Systems 33 (2020).

Taeg Sang Cho, Moshe Butman, Shai Avidan, and William T Freeman. 2008. The patch transform and its applications to image editing. In 2008 IEEE Conference on Computer Vision and Pattern Recognition. IEEE, 1-8.

Antonio Criminisi, Patrick Perez, and Kentaro Toyama. 2004. Region filling and object removal by exemplar-based image inpainting. IEEE Transactions on image processing 13, 9 (2004), 1200-1212.

Soheil Darabi, Eli Shechtman, Connelly Barnes, Dan B Goldman, and Pradeep Sen. 2012. Image melding: Combining inconsistent images using patch-based synthesis. ACM Transactions on graphics (TOG) 31, 4 (2012), 1-10.

Alexei A Efros andWilliam T Freeman. 2001. Image quilting for texture synthesis and transfer. In Proceedings of the 28th annual conference on Computer graphics and interactive techniques. ACM, 341-346.

Patrick Esser, Robin Rombach, and Bjorn Ommer. 2021. Taming transformers for high-resolution image synthesis. In Proceedings of the IEEE/CVF Conference on Computer Vision and Pattern Recognition. 12873-12883.

Ian Goodfellow, Jean Pouget-Abadie, Mehdi Mirza, Bing Xu, DavidWarde-Farley, Sherjil Ozair, Aaron Courville, and Yoshua Bengio. 2014. Generative adversarial nets. In Advances in neural information processing systems. 2672-2680.

Martin Heusel, Hubert Ramsauer, Thomas Unterthiner, Bernhard Nessler, and Sepp Hochreiter. 2017. Gans trained by a two timescale update rule converge to a local nash equilibrium. In Advances in Neural Information Processing Systems. 6626-6637.

Jonathan Ho, Ajay Jain, and Pieter Abbeel. 2020. Denoising diffusion probabilistic models. Advances in Neural Information Processing Systems 33 (2020), 6840-6851.

Seunghoon Hong, Xinchen Yan, Thomas S Huang, and Honglak Lee. 2018. Learning hierarchical semantic image manipulation through structured representations. Advances in Neural Information Processing Systems 31 (2018).

Mbing SongWei Huang Hongyu Liu, Bin Jiang and Chao Yang. 2020. Rethinking Image Inpainting via a Mutual Encoder-Decoder with Feature Equalizations. In Proceedings of the European Conference on Computer Vision.

Satoshi Iizuka, Edgar Simo-Serra, and Hiroshi Ishikawa. 2017. Globally and locally consistent image completion. ACM Transactions on Graphics (ToG) 36, 4 (2017), 1-14.

Phillip Isola, Jun-Yan Zhu, Tinghui Zhou, and Alexei A Efros. 2017. Image-to-image translation with conditional adversarial networks. In Proceedings of the IEEE conference on computer vision and pattern recognition. 1125-1134.

Jongheon Jeong and Jinwoo Shin. 2021. Training gans with stronger augmentations via contrastive discriminator. arXiv preprint arXiv:2103.09742 (2021).

Youngjoo Jo and Jongyoul Park. 2019. Sc-fegan: Face editing generative adversarial network with user's sketch and color. In Proceedings of the IEEE/CVF international conference on computer vision. 1745-1753.

Justin Johnson, Alexandre Alahi, and Li Fei-Fei. 2016. Perceptual losses for real-time style transfer and super-resolution. In European conference on computer vision. Springer, 694-711.

Minguk Kang and Jaesik Park. 2020. Contragan: Contrastive learning for conditional image generation. Advances in Neural Information Processing Systems 33 (2020), 21357-21369.

Tero Karras, Timo Aila, Samuli Laine, and Jaakko Lehtinen. 2017. Progressive growing of gans for improved quality, stability, and variation. arXiv preprint arXiv:1710.10196 (2017).

Tero Karras, Samuli Laine, and Timo Aila. 2019. A style-based generator architecture for generative adversarial networks. In Proceedings of the IEEE/CVF Conference on Computer Vision and Pattern Recognition. 4401-4410.

Tero Karras, Samuli Laine, Miika Aittala, Janne Hellsten, Jaakko Lehtinen, and Timo Aila. 2020. Analyzing and Improving the Image Quality of StyleGAN. In Proc. CVPR.

Diederik P Kingma and Jimmy Ba. 2014. Adam: A method for stochastic optimization. arXiv preprint arXiv:1412.6980 (2014).

Alexander Kirillov, Kaiming He, Ross Girshick, Carsten Rother, and Piotr Dollár. 2019. Panoptic segmentation. In Proceedings of the IEEE/CVF Conference on Computer Vision and Pattern Recognition. 9404-9413.

Nupur Kumari, Richard Zhang, Eli Shechtman, and Jun-Yan Zhu. 2021. Ensembling Off-the-shelf Models for GAN Training. arXiv preprint arXiv:2112.09130 (2021).

Vivek Kwatra, Irfan Essa, Aaron Bobick, and Nipun Kwatra. 2005. Texture optimization for example-based synthesis. In Acm Siggraph 2005 Papers. 795-802.

(56) References Cited

OTHER PUBLICATIONS

Chuan Li and Michael Wand. 2016. Precomputed real-time texture synthesis with markovian generative adversarial networks. In European conference on computer vision. Springer, 702-716.

Yanwei Li, Hengshuang Zhao, Xiaojuan Qi, Liwei Wang, Zeming Li, Jian Sun, and Jiaya Jia. 2021. Fully Convolutional Networks for Panoptic Segmentation. In Proceedings of the IEEE/CVF Conference on Computer Vision and Pattern Recognition. 214-223.

Tsung-Yi Lin, Michael Maire, Serge Belongie, James Hays, Pietro Perona, Deva Ramanan, Piotr Dollár, and C Lawrence Zitnick. 2014. Microsoft coco: Common objects in context. In European conference on computer vision. Springer, 740-755.

Guilin Liu, Fitsum A Reda, Kevin J Shih, Ting-Chun Wang, Andrew Tao, and Bryan Catanzaro. 2018. Image inpainting for irregular holes using partial convolutions. In Proceedings of the European Conference on Computer Vision (ECCV). 85-100.

Andreas Lugmayr, Martin Danelljan, Andres Romero, Fisher Yu, Radu Timofte, and Luc Van Gool. 2022. RePaint: Inpainting using Denoising Diffusion Probabilistic Models. arXiv preprint arXiv:2201.09865 (2022).

Liqian Ma, Xu Jia, Qianru Sun, Bernt Schiele, Tinne Tuytelaars, and Luc Van Gool. 2017. Pose guided person image generation. Advances in neural information processing systems 30 (2017).

Mehdi Mirza and Simon Osindero. 2014. Conditional generative adversarial nets. arXiv preprint arXiv:1411.1784 (2014).

Kamyar Nazeri, Eric Ng, Tony Joseph, Faisal Z Qureshi, and Mehran Ebrahimi. 2019. Edgeconnect: Generative image inpainting with adversarial edge learning. arXiv preprint arXiv:1901.00212 (2019).

Evangelos Ntavelis, Andres Romero, Iason Kastanis, Luc Van Gool, and Radu Timofte. 2020. Sesame: Semantic editing of scenes by adding, manipulating or erasing objects. In European Conference on Computer Vision. Springer, 394-411.

Taesung Park, Ming-Yu Liu, Ting-Chun Wang, and Jun-Yan Zhu. 2019. Semantic Image Synthesis with Spatially-Adaptive Normalization. In Proceedings of the IEEE Conference on Computer Vision and Pattern Recognition.

Taesung Park, Jun-Yan Zhu, Oliver Wang, Jingwan Lu, Eli Shechtman, Alexei A Efros, and Richard Zhang. 2020. Swapping autoencoder for deep image manipulation. arXiv preprint arXiv:2007.00653 (2020).

Deepak Pathak, Philipp Krahenbuhl, Jeff Donahue, Trevor Darrell, and Alexei A Efros. 2016. Context encoders: Feature learning by inpainting. In Proceedings of the IEEE conference on computer vision and pattern recognition. 2536-2544.

Tiziano Portenier, Qiyang Hu, Attila Szabo, Siavash Arjomand Bigdeli, Paolo Favaro, and Matthias Zwicker. 2018. Faceshop: Deep sketch-based face image editing. arXiv preprint arXiv:1804.08972 (2018).

Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al. 2021. Learning transferable visual models from natural language supervision. In International Conference on Machine Learning. PMLR, 8748-8763.

Chitwan Saharia, William Chan, Huiwen Chang, Chris A Lee, Jonathan Ho, Tim Salimans, David J Fleet, and Mohammad Norouzi. 2021. Palette: Image-to-image diffusion models. arXiv preprint arXiv:2111.05826 (2021).

Axel Sauer, Kashyap Chitta, Jens Müller, and Andreas Geiger. 2021. Projected gans converge faster. Advances in Neural Information Processing Systems 34 (2021).

Axel Sauer, Katja Schwarz, and Andreas Geiger. 2022. StyleGAN-XL: Scaling StyleGAN to Large Diverse Datasets. arXiv preprint arXiv:2202.00273 (2022).

Jianhong Shen and Tony F Chan. 2002. Mathematical models for local nontexture inpaintings. Siam J. Appl. Math. 62, 3 (2002), 1019-1043.

Yuhang Song, Chao Yang, Yeji Shen, Peng Wang, Qin Huang, and C-C Jay Kuo. 2018. Spg-net: Segmentation prediction and guidance network for image inpainting. arXiv preprint arXiv:1805.03356 (2018).

Roman Suvorov, Elizaveta Logacheva, Anton Mashikhin, Anastasia Remizova, Arsenii Ashukha, Aleksei Silvestrov, Naejin Kong, Harshith Goka, Kiwoong Park, and Victor Lempitsky. 2021. Resolution-robust Large Mask Inpainting with Fourier Convolutions. arXiv preprint arXiv:2109.07161 (2021).

Zheng, Haitian, et al. "Image Inpainting with Cascaded Modulation GAN and Object-Aware Training." Computer Vision-ECCV 2022: 17th European Conference, Tel Aviv, Israel, Oct. 23-27, 2022, Proceedings, Part XVI. Cham: Springer Nature Switzerland, 2022.

Ziyu Wan, Jingbo Zhang, Dongdong Chen, and Jing Liao. 2021. High-Fidelity Pluralistic Image Completion with Transformers. arXiv preprint arXiv:2103.14031 (2021).

Sheng-Yu Wang, Oliver Wang, Richard Zhang, Andrew Owens, and Alexei A Efros. 2020. Cnn-generated images are surprisingly easy to spot . . . for now. In Proceedings of the IEEE/CVF conference on computer vision and pattern recognition. 8695-8704.

Wei Xiong, Jiahui Yu, Zhe Lin, Jimei Yang, Xin Lu, Connelly Barnes, and JiebovLuo. 2019. Foreground-aware image inpainting. In Proceedings of the IEEE/CVF Conference on Computer Vision and Pattern Recognition. 5840-5848.

Jie Yang, Zhiquan Qi, and Yong Shi. 2020. Learning to incorporate structure knowledge for image inpainting. In Proceedings of the AAAI Conference on Artificial Intelligence, vol. 34. 12605-12612.

Zili Yi, Qiang Tang, Shekoofeh Azizi, Daesik Jang, and Zhan Xu. 2020. Contextual residual aggregation for ultra high-resolution image inpainting. In Proceedings of the IEEE/CVF Conference on Computer Vision and Pattern Recognition. 7508-7517.

Jiahui Yu, Zhe Lin, Jimei Yang, Xiaohui Shen, Xin Lu, and Thomas S Huang. 2018. Generative image inpainting with contextual attention. In Proceedings of the IEEE conference on computer vision and pattern recognition. 5505-5514.

Jiahui Yu, Zhe Lin, Jimei Yang, Xiaohui Shen, Xin Lu, and Thomas S Huang. 2019. Free-form image inpainting with gated convolution. In Proceedings of the IEEE International Conference on Computer Vision. 4471-4480.

Ning Yu, Guilin Liu, Aysegul Dundar, Andrew Tao, Bryan Catanzaro, Larry S Davis, and Mario Fritz. 2021. Dual contrastive loss and attention for gans. In Proceedings of the IEEE/CVF International Conference on Computer Vision. 6731-6742.

Yu Zeng, Zhe Lin, and Vishal M Patel. 2021. SketchEdit: Mask-Free Local Image Manipulation with Partial Sketches. arXiv preprint arXiv:2111.15078 (2021).

Yu Zeng, Zhe Lin, Jimei Yang, Jianming Zhang, Eli Shechtman, and Huchuan Lu. 2020. High-Resolution Image Inpainting with Iterative Confidence Feedback and Guided Upsampling. arXiv preprint arXiv:2005.11742 (2020).

Han Zhang, Jing Yu Koh, Jason Baldridge, Honglak Lee, and Yinfei Yang. 2021. Cross-modal contrastive learning for text-to-image generation. In Proceedings of the IEEE/CVF Conference on Computer Vision and Pattern Recognition. 833-842.

Richard Zhang, Phillip Isola, Alexei A Efros, Eli Shechtman, and Oliver Wang. 2018. The unreasonable effectiveness of deep features as a perceptual metric. In Proceedings of the IEEE Conference on Computer Vision and Pattern Recognition. 586-595.

Shengyu Zhao, Jonathan Cui, Yilun Sheng, Yue Dong, Xiao Liang, Eric I Chang, and Yan Xu. 2021. Large scale image completion via co-modulated generative adversarial networks. arXiv preprint arXiv:2103.10428 (2021).

Chuanxia Zheng, Tat-Jen Cham, and Jianfei Cai. 2021. Pluralistic Free-From Image Completion. International Journal of Computer Vision (2021), 1-20.

Chuanxia Zheng, Tat-Jen Cham, Jianfei Cai, and Dinh Phung. 2021. Bridging Global Context Interactions for High-Fidelity Image Completion. (2021). arXiv:cs.CV/2104.00845.

Bolei Zhou, Agata Lapedriza, Aditya Khosla, Aude Oliva, and Antonio Torralba. 2017. Places: A 10 million image database for scene recognition. IEEE transactions on pattern analysis and machine intelligence 40, 6 (2017), 1452-1464.

(56) References Cited

OTHER PUBLICATIONS

Ang Li, Jianzhong Qi, Rui Zhang, Ramamohanarao Kotagiri, Boosted GAN with Semantically Interpretable Information at least for Image Inpainting, IJCNN, Budapest, Hungary, 2019.

Combined Search and Examination Report as received in GB application 2311936.5 dated Feb. 6, 2024.

Combined Search and Examination Report as received in GB application 2311866.4 dated Feb. 9, 2024.

Combined Search and Examination Report as received in GB application 2311936.5 dated Feb. 9, 2024.

Heng Wang, et al., "Region and Object Based Panoptic Image Synthesis Through Conditional GANs". arXiv preprint arXiv:1912.060840v1, Dec. 14, 2019.

Examination Report as received in GB application 2311936.5 dated Oct. 16, 2024.

Martin Belan, "Testing The Photoshop 2022 Objection Selection Tool on a Variety of Nature Photographs." Oct. 30, 2021. Retrieved from the internet: <https://blog.martinbelan.com/2021/10/30/testing-the-photoshop-2023-object-finder-feature-on-a-variety-of-nature-photographs/>.

Daiqing Li et al. "Semantic segmentation with generative models: Semi-supervised learning and strong out-of-domain generalization." Proceedings of the IEEE/CVF Conference on Computer Vision and Pattern Recognition. (Year: 2021).

U.S. Appl. No. 17/937,680, filed Mar. 11, 2025, Office Action.

U.S. Appl. No. 17/937,695 filed Mar. 18, 2025.

U.S. Appl. No. 17/937,708 filed Feb. 5, 2025.

U.S. Appl. No. 17/937,680, filed May 27, 2025, Notice of Allowance.

U.S. Appl. No. 17/937,695, filed Jun. 18, 2025, Office Action.

\* cited by examiner

| Methods | CoModGAN masks | | | Object masks | | |
|---|---|---|---|---|---|---|
| | FID↓ | U-IDS (%)↑ | P-IDS (%)↑ | FID↓ | U-IDS (%)↑ | P-IDS (%)↑ |
| *inpainting w/ panoptic segm.* | | | | | | |
| SESAME* | 12.0061 | 7.41 | 0.24 | 8.3656 | 9.91 | 0.41 |
| LaMa* | 7.0563 | 21.74 | 4.83 | 4.8156 | 26.28 | 7.39 |
| CoModGAN* | 5.0168 | 29.58 | 14.94 | 4.4232 | 31.59 | 16.75 |
| CM-GAN* | 2.8470 | 33.20 | 18.50 | 2.7246 | 34.42 | 19.66 |
| Panoptic Inpainting System | 2.0720 | 36.96 | 25.90 | 1.8682 | 37.90 | 26.30 |
| *inpainting w/ semantic segm.* | | | | | | |
| SESAME | 12.2308 | 7.09 | 0.22 | 8.3940 | 9.75 | 0.40 |
| Panoptic Inpainting System | 2.3860 | 33.11 | 19.25 | 2.1565 | 34.85 | 21.12 |
| *inpainting w/ edge* | | | | | | |
| EdgeConnect | 41.7631 | 3.18 | 0.04 | 22.9517 | 3.98 | 0.06 |
| SketchEdit | 16.1271 | 13.02 | 1.58 | 8.7878 | 19.77 | 3.21 |
| Panoptic Inpainting System | 2.6909 | 33.43 | 20.45 | 2.1873 | 36.19 | 23.46 |

*Fig. 12*

| Methods | CoModGAN masks | | | Object masks | | |
|---|---|---|---|---|---|---|
| | FID↓ | U-IDS (%)↑ | P-IDS (%)↑ | FID↓ | U-IDS (%)↑ | P-IDS (%)↑ |
| Panoptic Inpainting System w/ adv. | 10.5587 | 20.60 | 5.56 | 9.3800 | 22.70 | 6.38 |
| Panoptic Inpainting System w/ adv. + perc. | 2.8470 | 33.20 | 18.50 | 2.7246 | 34.42 | 19.66 |
| Panoptic Inpainting System w/ adv. + perc. + sem. D | 2.2705 | 35.41 | 22.30 | 2.1636 | 36.12 | 22.98 |
| Panoptic Inpainting System w/ adv. + perc. + sem. D + obj. D (full) | 2.0720 | 36.96 | 25.90 | 1.8682 | 37.90 | 26.30 |
| Panoptic Inpainting System full w/ semantic segm. | 2.3860 | 33.11 | 19.25 | 2.1565 | 34.85 | 21.12 |

Generating A Predicted Digital Image From A Semantic Segmentation 1602

Utilizing A Semantic Discriminator 1604

Generating A Semantic Image Embedding From The Predicted Digital Image 1606

Generating A Realism Prediction From The Semantic Image Embedding 1608

Modifying The Parameters Of A Neural Network Based On The Realism Prediction 1610

Fig. 16

GENERATING AND PROVIDING A PANOPTIC INPAINTING INTERFACE FOR GENERATING AND MODIFYING INPAINTED DIGITAL IMAGES

BACKGROUND

In the field of digital image editing, deep generative models have become increasingly effective in various applications, such as producing realistic images from randomly sampled seeds or image inpainting. These models, such as generative adversarial networks ("GANs"), have revolutionized digital image synthesis, enabling digital image modifications by extracting and combining features across digital images. Indeed, GANs have made significant progress in digital image inpainting to fill missing or flawed regions of pixels. Despite the advances of conventional digital image systems that utilize these models, however, these conventional systems continue to suffer from a number of disadvantages, such as accuracy in inpainting digital images over regions of pixels that share a semantic label but depict different object instances.

SUMMARY

This disclosure describes one or more embodiments of systems, methods, and non-transitory computer readable media that solve one or more of the foregoing or other problems in the art by panoptically guiding digital image inpainting utilizing a panoptic inpainting neural network. For example, the disclosed systems utilize a panoptic inpainting neural network to generate an inpainted digital image according to panoptic segmentation map that defines pixel regions corresponding to different panoptic labels that differentiate between instances of objects with shared semantic labels. In some embodiments, by utilizing the panoptic inpainting neural network, the disclosed systems accurately inpaint pixels in a designated area (e.g., an area of flawed or missing pixels) of a digital image with replacement pixels corresponding to different panoptic labels within the designated area.

In some embodiments, the disclosed systems train or tune a neural network (e.g., a panoptic inpainting neural network or some other neural network) utilizing a semantic discriminator. For example, the disclosed systems implement an adversarial training technique with a generator and a semantic discriminator to accurately learn parameters of a neural network to account for semantic (or panoptic) labels in respective network channels. In some cases, the semantic discriminator has a unique architecture that facilitates generation of digital images that are realistic while also conforming to a semantic segmentation.

In one or more embodiments, the disclosed systems provide a panoptic inpainting interface for display on a client device. For example, the disclosed systems generate and provide a panoptic inpainting interface to facilitate user interaction for inpainting digital images. In some cases, the panoptic inpainting interface includes selectable elements for modifying or customizing a panoptic segmentation map to adjust how a digital image is inpainted (e.g., what pixels will be used to inpaint a designated area of a digital image).

Additionally, in certain embodiments, the disclosed systems iteratively update an inpainted digital image utilizing dynamic panoptic guidance. For example, the disclosed systems receive modifications to a panoptic segmentation map as a user changes panoptic labels and/or region boundaries within a panoptic inpainting interface. In some cases, the disclosed systems update an inpainted digital image to reflect the modifications made to the panoptic segmentation map.

BRIEF DESCRIPTION OF THE DRAWINGS

This disclosure describes one or more embodiments of the invention with additional specificity and detail by referencing the accompanying figures. The following paragraphs briefly describe those figures, in which:

FIG. 12 illustrates example experimental results comparing the panoptic inpainting system with prior systems in accordance with one or more embodiments;

FIG. 14 illustrates example experimental results of an ablation study of the panoptic inpainting system in accordance with one or more embodiments;

FIG. 16 illustrates a flowchart of a series of acts for training a neural network utilizing a semantic discriminator in accordance with one or more embodiments;

DETAILED DESCRIPTION

Figure 1:
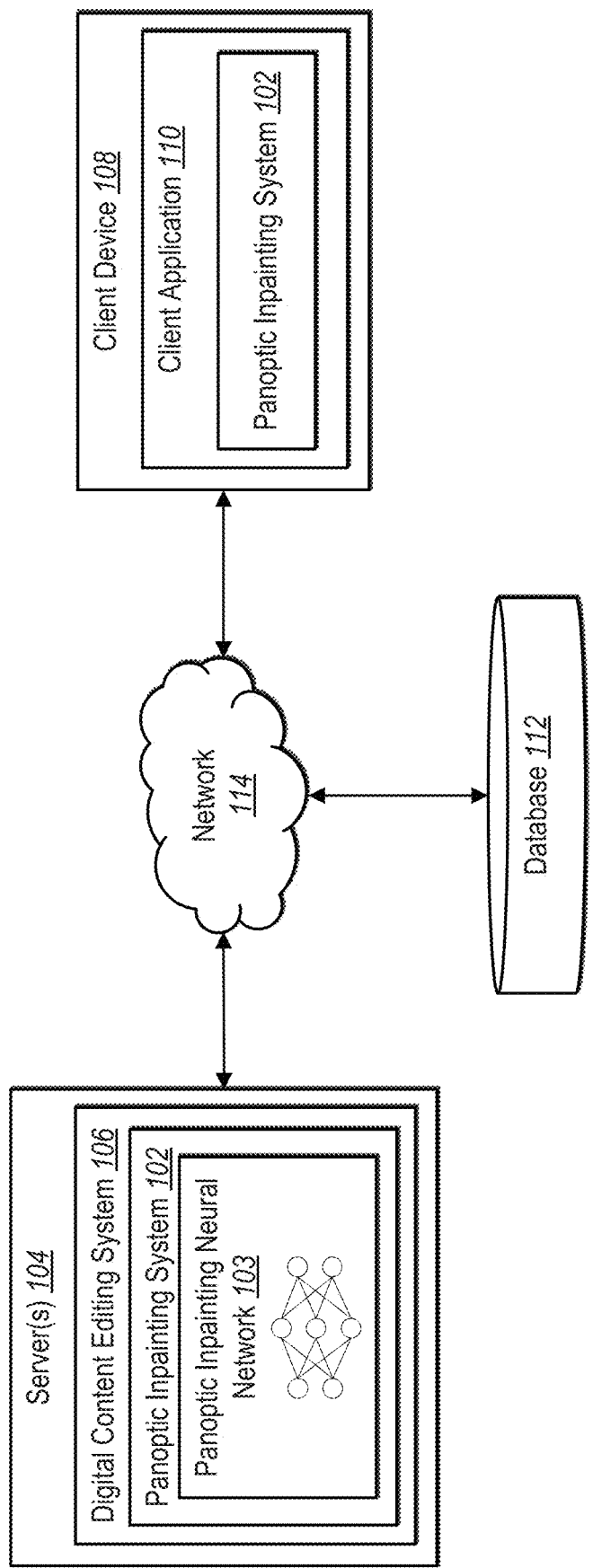
FIG. 1 illustrates an example system environment in which a panoptic inpainting system operates in accordance with one or more embodiments.

This disclosure describes one or more embodiments of a panoptic inpainting system that panoptically guides digital image inpainting utilizing a panoptic inpainting neural network. For example, the panoptic inpainting system inpaints a designated area of a digital image according to panoptic labels associated with portions of the designated area, where the panoptic labels define the (types of) replacement pixels used to fill the various portions of the designated area. In some cases, the panoptic inpainting system learns parameters for a neural network (e.g., the panoptic inpainting neural network or some other neural network) utilizing a semantic discriminator having a unique architecture that facilitates inpainting realistic pixels into a digital image while also conforming to semantic constraints. Additionally, in some embodiments, the panoptic inpainting system utilizes a panoptic inpainting interface to enable client devices to interact with inpainted digital images and/or corresponding panoptic segmentation maps to modify how the digital images are inpainted. In some cases, the panoptic inpainting system also iteratively updates inpainted digital images according to adjustments to a panoptic segmentation map to reflect pixels corresponding to updated boundaries and/or labels of the map.

As just mentioned, in one or more embodiments, the panoptic inpainting system generates inpainted digital images utilizing a panoptic inpainting neural network. For example, the panoptic inpainting system inpaints a designated area of a digital image, where the designated area includes or depicts pixels that are flawed or missing or otherwise designated as pixels to be replaced. In some cases, the panoptic inpainting system indicates the designated area utilizing a binary mask to distinguish between pixels to be replaced and pixels to be preserved during inpainting.

In certain embodiments, the panoptic inpainting system further identifies, generates, or receives a panoptic segmentation map that defines panoptic labels for regions of pixels corresponding to the digital image, including labels for replacement pixels to fill the designated area. As described in further detail below, a panoptic label differs from a semantic label in that a panoptic label differentiates between different instances of the same semantic label (e.g., a first tree and a second tree). In some embodiments, the panoptic inpainting system further generates an inpainted digital image by filling or inpainting the designated area with replacement pixels according to the panoptic segmentation map. Additional detail regarding inpainting digital images utilizing a panoptic inpainting neural network is provided below with reference to the figures.

In one or more embodiments, the panoptic inpainting system utilizes a semantic discriminator to build or train a neural network, such as a panoptic inpainting neural network or some other generative neural network. For instance, the panoptic inpainting system utilizes a semantic discriminator to learn parameters for a neural network that generates digital images that or both realistic and that conform to certain semantic constraints.

In some cases, the semantic discriminator has a unique architecture not found in other discriminator neural networks. For example, the semantic discriminator includes an image embedding model and a series of convolutional layers that together generate a realism prediction for a digital image generated by a generator neural network. Specifically, in some embodiments, the semantic discriminator includes a first encoder (that analyzes the digital image) and a second encoder that analyzes the digital image and a panoptic condition corresponding to the digital image (e.g., a mask, a semantic label map, and edge map derived from the panoptic segmentation map). The panoptic inpainting system can utilize encodings from the first encoder and the second encoder to generate a realism prediction and adversarial loss in training the inpainting neural network. Moreover, in some embodiments, the panoptic inpainting system utilizes multiple semantic discriminators at different levels. For example, the panoptic inpainting system can apply an image-level semantic discriminator (e.g., to the whole digital image) and an object-level semantic discriminator (e.g., to an object portrayed in the digital image).

The panoptic inpainting system can further determine various losses associated with the realism prediction, such as one or more adversarial losses associated with different discriminators, where the adversarial losses are used to adjust parameters of a neural network (e.g., the generator neural network and/or the semantic discriminator) to improve accuracy. Additional detail regarding the semantic discriminator and training neural networks using the semantic discriminator is provided below with reference to the figures.

In one or more embodiments, the panoptic inpainting system generates and provides a user interface for generative and modifying inpainted digital images. For example, the panoptic inpainting system provides a panoptic inpainting interface for display on a client device (e.g., a digital image editing device). Within the panoptic inpainting interface, in some embodiments, the panoptic inpainting system provides selectable elements for defining a designated area of a digital image (e.g., by drawing or otherwise applying a binary mask to pixels of the digital image), generating an inpainted digital image by filling a designated area with replacement pixels, and/or generating or modifying a panoptic segmentation map defining (types of) replacement pixels for filling a designated area of pixels to be replaced. Indeed, in some cases, the panoptic inpainting system provides inpainting tools, such as panoptic segment brushes that define regions of pixels for certain objects or panoptic labels as well as an edge pencil for defining edges or boundaries of different panoptic regions of a panoptic segmentation map. Additional detail regarding the panoptic inpainting interface, including the various selectable elements used for modifying digital images, binary masks, and/or panoptic segmentation maps, is provided below with reference to the figures.

In certain embodiments, the panoptic inpainting system iteratively updates or modifies an inpainted digital image. For example, the panoptic inpainting system receives (e.g., from a client device via a panoptic inpainting interface) an indication of user interaction to adjust or modify panoptic labels and/or region boundaries of a panoptic segmentation map. Based on the modifications to the panoptic segmentation map, the panoptic inpainting system modifies or updates a (or generates a new) inpainted digital image to reflect the changes to the map. For instance, if the panoptic inpainting system receives user interaction to increase an area of a sky region within a panoptic segmentation map, the panoptic inpainting system modifies the inpainted digital image by likewise increasing the area of the sky pixels in the inpainted digital image (e.g., to match the updated panoptic segmentation map).

As suggested above, many conventional digital image systems exhibit a number of shortcomings or disadvantages, particularly in accuracy, flexibility, and computational efficiency. For example, in the field of digital image editing, some existing systems inaccurately inpaint digital images. To elaborate, many prior systems can only accommodate (or are reliant on) semantic definitions for regions of pixels and, as a result, these systems often generate inpainted digital images that are nonsensical. Indeed, in cases where a designated area of a digital image depicts two objects that are adjacent to one another (or that overlap by some portion) and that share a common semantic label, many prior systems inpaint the designated area by generating one misshapen blob of pixels that results from attempting to generate one object of the semantic label where the two separate objects should appear.

As a contributing factor to their inaccuracies, some existing digital image systems are inflexible. More specifically, as suggested above, prior systems are rigidly fixed to semantic constraints. Consequently, conventional systems cannot adapt to circumstances where pixels to be replaced within digital images depict multiple overlapping objects or regions that share semantic labels. Rather than generating an inpainted digital image that distinguishes between the different objects, prior systems generate replacement pixels that merge the separate objects into one large object during inpainting.

In addition to their inaccuracies and inflexibilities, some conventional digital image systems are also computationally inefficient. For example, many prior systems provide inefficient user interfaces that require large numbers of user interactions to navigate through many image editing tools, interfaces, and windows to perform inpainting on digital images. Indeed, many existing systems use complicated image editing tools that require nuanced application by a professional user through many hundreds or thousands of individual inputs to properly edit pixels for an inpainting task. Processing the excessive numbers of user interactions for inpainting digital images via conventional interfaces requires computing devices to expend large amounts of computing resources, such as processing power and memory, that could otherwise be preserved with more efficient user interfaces that reduce user interactions.

In solving one or more of the aforementioned shortcomings of prior systems, embodiments of the panoptic inpainting system provide a variety of improvements or advantages over conventional digital image systems. For example, embodiments of the panoptic inpainting system introduce a new functionality not found in prior systems. To elaborate, unlike prior systems that are limited to semantic information, the panoptic inpainting system performs digital image inpainting based on panoptic information, something prior systems cannot do. Indeed, the panoptic inpainting system utilizes a panoptic inpainting neural network to inpaint a digital image according to panoptic segmentations that differentiate between different instances of objects of the same type (e.g., sharing a common semantic label).

Due at least in part to introducing panoptic digital image inpainting, in some embodiments, the panoptic inpainting system improves accuracy over conventional systems. Indeed, while prior systems often mistakenly blend or combine objects of the same semantic label into single structures or pixel regions, the panoptic inpainting system utilizes a panoptic inpainting neural network that utilizes a panoptic segmentation map to distinguish between instances of a semantic label to inpaint pixels more accurately. For example, the panoptic inpainting system inpaints a designated area of pixels covered by multiple panoptic regions each labeled as "tree" by generating an individual tree for each instance rather than a single malformed tree as generated by many prior systems.

In addition, in some embodiments, the panoptic inpainting system improves flexibility over conventional digital image systems. As opposed to conventional systems that are rigidly fixed to semantic considerations, the panoptic inpainting system is adaptable to inpaint digital images according to panoptic information, in addition to semantic information and/or edge information. Indeed, the panoptic inpainting system flexibly accommodates digital image inpainting based on semantic segmentation maps, panoptic segmentation maps, and/or edge maps.

Additionally, embodiments of the panoptic inpainting system also improve computational efficiency over conventional digital image systems. While some prior systems provide inefficient user interfaces that require excessive numbers of user interactions to inpaint digital images using many applications of complex, sophisticated tools, the panoptic inpainting system provides a simplified interface that requires far fewer user interactions. Indeed, the panoptic inpainting system generates and provides a panoptic inpainting interface that (in some embodiments) includes a single element selectable to panoptically inpaint a digital image. Thus, the panoptic inpainting system reduces the user interactions of inpainting from hundreds or thousands using conventional editing tools down to a single user interaction (or handful of interactions). Along these lines, the panoptic inpainting system also provides simple tools for efficient editing of panoptic segmentation maps and binary masks to update inpainted digital images. By reducing the number of user interactions, the panoptic inpainting system also reduces the computational burden of processing the user interactions using a more efficient user interface.

Additional detail regarding the panoptic inpainting system will now be provided with reference to the figures. For example, FIG. 1 illustrates a schematic diagram of an example system environment for implementing a panoptic inpainting system 102 in accordance with one or more embodiments. An overview of the panoptic inpainting system 102 is described in relation to FIG. 1. Thereafter, a more detailed description of the components and processes of the panoptic inpainting system 102 is provided in relation to the subsequent figures.

As shown, the environment includes server(s) 104, a client devices 108, a database 112, and a network 114. Each of the components of the environment communicate via the network 114, and the network 114 is any suitable network over which computing devices communicate. Example networks are discussed in more detail below in relation to FIG. 20.

As mentioned, the environment includes client device 108. The client device 108 are one of a variety of computing devices, including a smartphone, a tablet, a smart television, a desktop computer, a laptop computer, a virtual reality device, an augmented reality device, or another computing device as described in relation to FIG. 20. The client device 108 communicate with the server(s) 104 via the network 114. For example, the client device 108 provide information to server(s) 104 indicating client device interactions (e.g., digital image selections, image inpainting requests, panoptic segmentation map editing requests, or other input) and receive information from the server(s) 104 such as inpainted digital images. Thus, in some cases, the panoptic inpainting system 102 on the server(s) 104 provides and receives information based on client device interaction via the client device 108.

As shown in FIG. 1, the client device 108 includes a client application 110. In particular, the client application 110 is a web application, a native application installed on the client device 108 (e.g., a mobile application, a desktop application, etc.), or a cloud-based application where all or part of the functionality is performed by the server(s) 104. Based on instructions from the client application 110, the client device 108 presents or displays information to a user, including digital images such as inpainted digital images, panoptic segmentation masks, and/or selectable options for generating and inpainting digital images and/or panoptic segmentation masks. In some cases, the client application 110 includes all or part of the panoptic inpainting system 102 and/or the panoptic inpainting neural network 103.

As illustrated in FIG. 1, the environment includes the server(s) 104. The server(s) 104 generates, tracks, stores, processes, receives, and transmits electronic data, such as image inpainting inputs, binary masks, and/or panoptic segmentation maps. For example, the server(s) 104 receives data from the client device 108 in the form of an indication of a client device interaction to generate or modify an inpainted digital image. In response, the server(s) 104 transmits data to the client device to cause the client device 108 to display or present a modified inpainted digital image based on the client device interaction.

In some embodiments, the server(s) 104 communicates with the client device 108 to transmit and/or receive data via the network 114, including client device interactions, image inpainting requests, binary masks, panoptic segmentation maps, and/or other data. In some embodiments, the server(s) 104 comprises a distributed server where the server(s) 104 includes a number of server devices distributed across the network 114 and located in different physical locations. The server(s) 104 comprise a content server, an application server, a communication server, a web-hosting server, a multidimensional server, a container orchestration server, or a machine learning server. The server(s) 104 further access and utilize the database 112 to store and retrieve information such as stored digital images, inpainted digital images, binary masks, panoptic segmentation maps, and/or generated image differential metrics.

As further shown in FIG. 1, the server(s) 104 also includes the panoptic inpainting system 102 as part of a digital content editing system 106. For example, in one or more implementations, the digital content editing system 106 is able to store, generate, modify, edit, enhance, provide, distribute, and/or share digital content, such as inpainted digital images and panoptic segmentation maps. For example, the digital content editing system 106 provides tools for the client device 108, via the client application 110, to generate and modify inpainted digital images and panoptic segmentation maps.

In one or more embodiments, the server(s) 104 includes all, or a portion of, the panoptic inpainting system 102. For example, the panoptic inpainting system 102 operates on the server(s) to generate and provide inpainted digital images. In some cases, the panoptic inpainting system 102 utilizes, locally on the server(s) 104 or from another network location (e.g., the database 112), a panoptic inpainting neural network 103 to generate inpainted digital images. In addition, the panoptic inpainting system 102 includes or communicates with a panoptic inpainting neural network 103 (and/or a semantic discriminator for training).

In certain cases, the client device 108 includes all or part of the panoptic inpainting system 102. For example, the client device 108 generates, obtains (e.g., download), or utilizes one or more aspects of the panoptic inpainting system 102 from the server(s) 104. Indeed, in some implementations, as illustrated in FIG. 1, the panoptic inpainting system 102 is located in whole or in part on the client device 108. For example, the panoptic inpainting system 102 includes a web hosting application that allows the client device 108 to interact with the server(s) 104. To illustrate, in one or more implementations, the client device 108 accesses a web page supported and/or hosted by the server(s) 104.

In one or more embodiments, the client device 108 and the server(s) 104 work together to implement the panoptic inpainting system 102. For example, in some embodiments, the server(s) 104 train one or more neural networks discussed herein and provide the one or more neural networks to the client device 108 for implementation. In some embodiments, the server(s) 104 train one or more neural networks, the client device 108 request image edits, the server(s) 104 generate inpainted digital images and panoptic segmentation maps utilizing the one or more neural networks. Furthermore, in some implementations, the client device 108 assists in training one or more neural networks.

Although FIG. 1 illustrates a particular arrangement of the environment, in some embodiments, the environment has a different arrangement of components and/or may have a different number or set of components altogether. For instance, as mentioned, the panoptic inpainting system 102 is implemented by (e.g., located entirely or in part on) the client device 108. In addition, in one or more embodiments, the client device 108 communicates directly with the panoptic inpainting system 102, bypassing the network 114. Further, in some embodiments, the panoptic inpainting neural network 103 includes one or more components stored in the database 112, maintained by the server(s) 104, the client device 108, or a third-party device.

Figure 2:
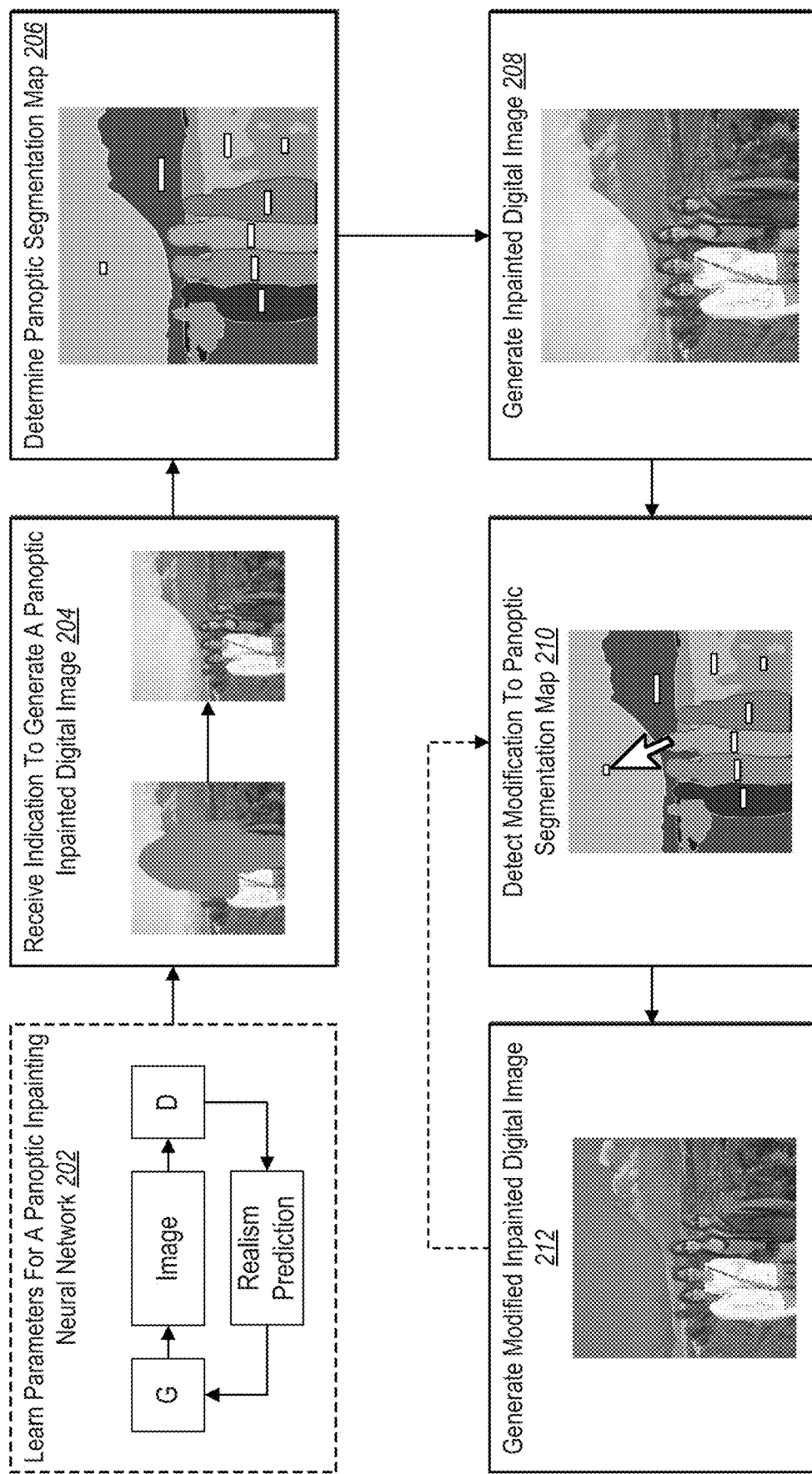
FIG. 2 illustrates an overview of generating and modifying inpainted digital images utilizing a panoptic inpainting neural network in accordance with one or more embodiments.

As mentioned, in one or more embodiments, the panoptic inpainting system 102 generates and/or modifies an inpainted digital image utilizing a panoptic inpainting neural network. In particular, the panoptic inpainting system 102 learns parameters for a panoptic inpainting neural network utilizing a semantic discriminator, and the panoptic inpainting system 102 implements the panoptic inpainting neural network to generate an inpainted digital image by generating replacement pixels to fill missing or flawed pixels of a digital image. FIG. 2 illustrates an example overview of generating and modifying an inpainted digital image utilizing a panoptic inpainting neural network in accordance with one or more embodiments. Additional detail regarding the various acts illustrated in FIG. 2 is provided thereafter with reference to subsequent figures.

As illustrated in FIG. 2, in one or more embodiments, the panoptic inpainting system 102 performs an act 202 to learn parameters for a panoptic inpainting neural network. To elaborate, the panoptic inpainting system 102 learns internal parameters for the panoptic inpainting neural network by training the panoptic inpainting neural network utilizing a semantic discriminator. For example, a neural network refers to a machine learning model that can be trained and/or tuned based on inputs to generate predictions, determine classifications, or approximate unknown functions. For example, a neural network includes a model of interconnected artificial neurons (e.g., organized in layers) that communicate and learn to approximate complex functions and generate outputs (e.g., generated digital images) based on a plurality of inputs provided to the neural network. In some cases, a neural network refers to an algorithm (or set of algorithms) that implements deep learning techniques to model high-level abstractions in data. For example, a neural network can include a convolutional neural network, a recurrent neural network (e.g., an LSTM), a graph neural network, or a generative adversarial neural network.

Along these lines, in some embodiments, a panoptic inpainting neural network includes a neural network that generates an inpainted digital image based on a panoptic segmentation map. For example, a panoptic inpainting neural network refers to a generative adversarial neural network that inpaints a designated area of a digital image with replacement pixels as dictated by a panoptic segmentation map. A generative adversarial neural network ("GAN") refers to a neural network that is tuned or trained via an adversarial process to generate an output digital image from an input such as a noise vector.

In some cases, a generative adversarial neural network includes multiple constituent neural networks such as an encoder neural network and one or more generator neural networks. For example, an encoder neural network extracts latent code from a noise vector or from a digital image. A generator neural network (or a combination of generator neural networks) generates a modified digital image by combining extracted latent code (e.g., from the encoder neural network). A discriminator neural network, in competition with the generator neural network, analyzes a generated digital image to generate a realism prediction by determining whether the generated digital image is real (e.g., from a set of stored digital images) or fake (e.g., not from the set of stored digital images). The discriminator neural network also modification of parameters of an encoder neural network, a generator neural networks, and/or a discriminator neural network to eventually generate digital images that fool the discriminator neural network into indicating that a generated digital image is a real digital image.

Relatedly, in some embodiments, a semantic discriminator refers to a discriminator neural network for generating a realism prediction based on a semantic embedding of a digital image. For example, a semantic discriminator generates a realism prediction from a combination of a semantic image embedding extracted from a digital image and an image embedding generated from the digital image (e.g., using an encoder or an image embedding model).

While FIG. 2 illustrates learning parameters for a panoptic inpainting neural network using the semantic discriminator, in some embodiments, the panoptic inpainting system 102 utilizes the semantic discriminator to learn parameters of other neural networks (e.g., outside the context of panoptic inpainting). For instance, the panoptic inpainting system 102 performs the act 202 to learn parameters for a neural network that generates digital images. To elaborate, the panoptic inpainting system 102 generates a predicted digital image utilizing a generative neural network. In addition, the panoptic inpainting system 102 generates a semantic embedding from the predicted digital image utilizing a semantic discriminator and further generates a realism prediction from the semantic embedding. In some cases, the panoptic inpainting system 102 generates a realism prediction in the form of realism score indicating a measure (e.g., a probability or a likelihood) that a predicted digital image generated by a neural network is real. In other cases, the panoptic inpainting system 102 generates a binary realism prediction that indicates whether the predicted digital image is real.

Based on the realism prediction, the panoptic inpainting system 102 modifies parameters of the neural network (e.g., the panoptic inpainting neural network). For example, the panoptic inpainting system 102 adjusts internal weights and biases of an encoder neural network, a generator neural network, and/or a discriminator neural network within the overall neural network to improve accuracy in generating realistic digital images. Not only does the panoptic inpainting system 102 adjust parameters to improve realism for generated digital images, but the panoptic inpainting system 102 further adjusts parameters to improve conformity to semantic information. Specifically, by utilizing the semantic discriminator that generates the realism prediction based on a semantic embedding of a predicted digital image, the panoptic inpainting system 102 learns parameters for realism as well as adherence to semantic constraints.

As further illustrated in FIG. 2, the panoptic inpainting system 102 performs an act 204 to receive an indication to generate a panoptically inpainted digital image. For example, the panoptic inpainting system 102 receives an indication of user interaction from a client device requesting generation of an inpainted digital image. In some cases, the panoptic inpainting system 102 receives a user interaction from a panoptic inpainting interface displayed on a client device selecting an inpainting element to request inpainting of a digital image (e.g., to fill a designated area of pixels to be replaced using replacement pixels). As shown, the panoptic inpainting system 102 identifies the designated area of missing or flawed pixels indicated by a binary mask obfuscating or occluding a portion of the digital image depicting four women against a mountain backdrop.

Additionally, the panoptic inpainting system 102 performs an act 206 to determine a panoptic segmentation map. In some cases, a panoptic segmentation map includes a layout or arrangement of panoptic segments corresponding to a digital image. For instance, a panoptic segmentation map includes boundaries or edges separating different areas or regions associated with respective panoptic labels indicating objects or types of pixels of a corresponding digital image (e.g., "sky" pixels or "car" pixels). A panoptic segmentation map further distinguishes between instances of objects or regions depicting pixels of a shared semantic label (e.g., "person") so that the objects or regions have distinct panoptic labels (e.g., a first person and a second person).

To determine the panoptic segmentation map, in some cases, the panoptic inpainting system 102 utilizes a segmentation neural network to generate or predict panoptic segments from a digital image, where the panoptic segments indicate boundaries or edges for different pixel regions as well as labels corresponding to the pixel regions. In certain embodiments, the panoptic inpainting system 102 determines the panoptic segmentation map from user interaction via a client device to draw or otherwise define boundaries for pixel regions and to input labels for the panoptic regions. As shown, the panoptic segmentation map indicates various boundaries and labels for pixels of a digital image, including multiple instances of "person" pixels that are distinct from one another.

As further illustrated in FIG. 2, the panoptic inpainting system 102 performs an act 208 to generate an inpainted digital image. To elaborate, based on learned parameters for a panoptic inpainting neural network that accurately generates digital images for realism and semantic conformity (e.g., as described in relation to the act 202), the panoptic inpainting system 102 utilizes the trained panoptic inpainting neural network to generate an inpainted digital image. More specifically, the panoptic inpainting system 102 utilizes the panoptic inpainting neural network to panoptically guide generation of an inpainted digital image according to a panoptic segmentation map (e.g., as determined via the act 206). Indeed, the panoptic inpainting system 102 inpaints a digital image to replace pixels of a designated area of pixels to be replaced by following a semantic segmentation map indicating which pixels (e.g., sky pixels or person pixels or tree pixels) to inpaint in which portions of the designated area (while leaving pixels outside of the designated area unaffected). As shown, the inpainted digital image depicts pixels inpainted for the four women that were within the designated (e.g., masked) area, while distinguishing between each of the women according to the panoptic segmentation map.

As further illustrated in FIG. 2, the panoptic inpainting system 102 performs an act 210 to detect a modification to a panoptic segmentation map. For example, the panoptic inpainting system 102 receives a user interaction via a client device to adjust a boundary or edge of one or more regions within a panoptic segmentation map. As another example, the panoptic inpainting system 102 receives a user interaction to change a panoptic label associated with one or more regions of a panoptic segmentation map. In some cases, the panoptic inpainting system 102 detects or receives a user interaction to erase a boundary, erase a label, and/or erase a region of the panoptic segmentation map. In certain embodiments, the panoptic inpainting system 102 receives a user interaction to draw and label a new region not depicted within a digital image (e.g., to add pixels for an object not shown in the digital image).

In addition, based on detecting a modification to a panoptic segmentation map, the panoptic inpainting system 102 performs an act 212 to generate a modified inpainted digital image. More specifically, the panoptic inpainting system 102 generates a modified inpainted digital image to reflect the modification made to the panoptic segmentation map. Indeed, the panoptic inpainting system 102 updates an inpainted digital image to reflect new boundaries and/or labels for regions of a panoptic segmentation map by generating matching replacement pixels to fill the respective regions.

As shown, in some embodiments, the panoptic inpainting system 102 repeats the acts 210 and 212. Indeed, in some cases, the panoptic inpainting system 102 receives additional user interaction to further update or modify a panoptic segmentation map, and the panoptic inpainting system 102 then updates the inpainted digital image accordingly. In some embodiments, the panoptic inpainting system 102 updates the inpainted digital image automatically with each input to change the panoptic segmentation map (e.g., without requiring further input to request the update to the inpainted digital image), while in other embodiments the panoptic inpainting system 102 generates a modified inpainted digital image in response to a user interaction with an inpainting element.

Figure 3:
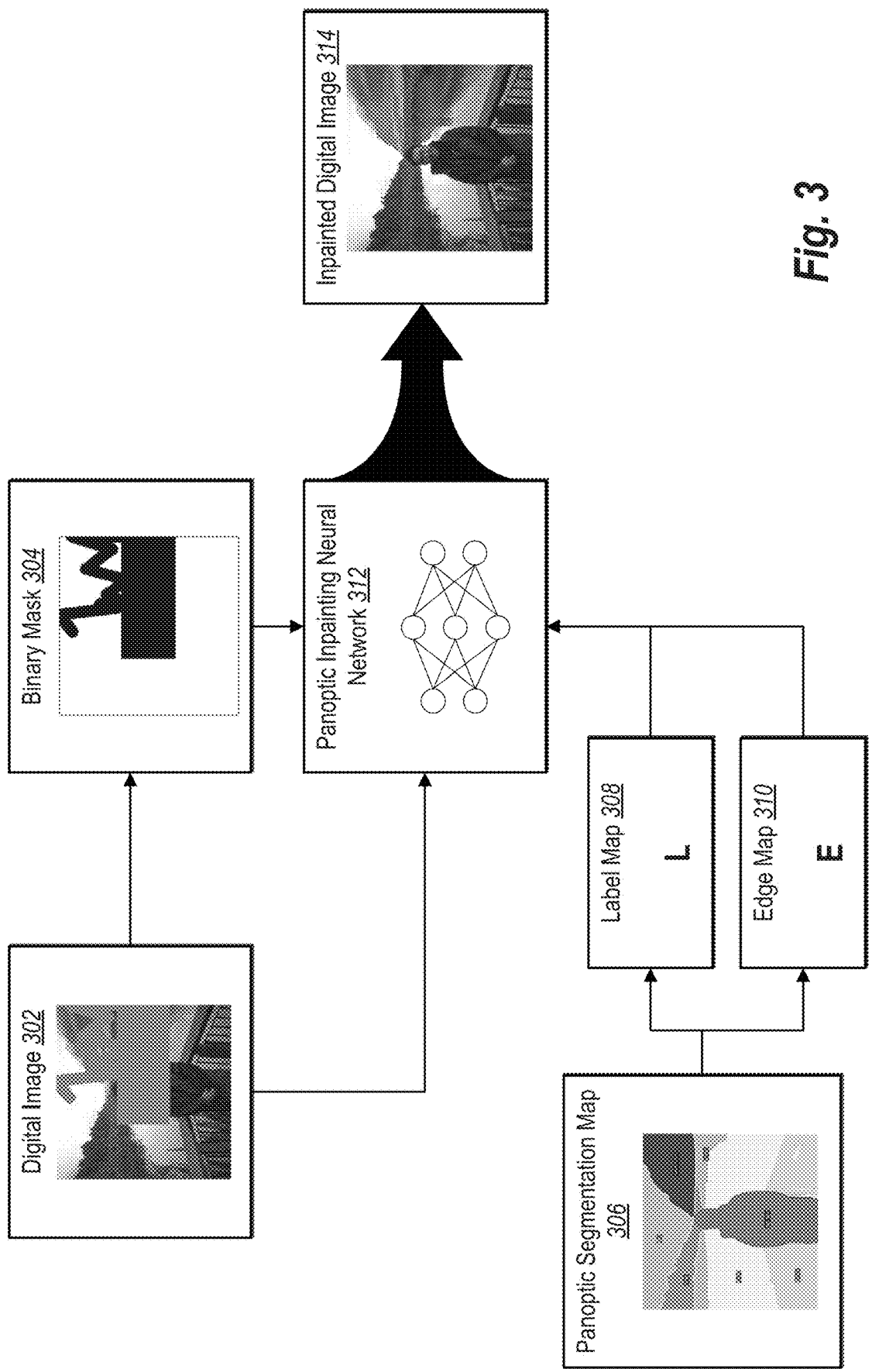
FIG. 3 illustrates an example diagram for utilizing a panoptic inpainting neural network to generate an inpainted digital image based on a panoptic segmentation map in accordance with one or more embodiments.

As mentioned above, in certain described embodiments, the panoptic inpainting system 102 generates an inpainted digital image utilizing a panoptic inpainting neural network. In particular, the panoptic inpainting system 102 inpaints a digital image by filling a designated area of pixels to be replaced with replacement pixels according to a panoptic segmentation map. FIG. 3 illustrates an example diagram of generating an inpainted digital image utilizing a panoptic inpainting neural network in accordance with one or more embodiments.

As illustrated in FIG. 3, the panoptic inpainting system 102 identifies a digital image 302. In particular, the panoptic inpainting system 102 identifies or receives the digital image 302 from a client device (e.g., the client device 108). For instance, the panoptic inpainting system 102 receives the digital image 302 as an upload or an indication of a digital image to inpaint. As shown, the digital image 302 depicts a designated area of pixels to be replace, as represented by the gray occlusion hiding or removing some of the pixels of the digital image 302.

In one or more embodiments, the panoptic inpainting system 102 determines or identifies the designated area based on a binary mask 304. To elaborate, the panoptic inpainting system 102 identifies or receives (e.g., from the client device 108) the binary mask 304 indicating a region of pixels to be replaced (e.g., a region of pixels to be inpainted by either filling a portion of a digital image or adding pixels to a digital image). In some cases, the panoptic inpainting system 102 generates the binary mask 304 utilizing a mask generator neural network. For instance, the panoptic inpainting system 102 utilizes the mask generator neural network of the CoModGAN model described by Yu Zheng, Zhe Lin, Jimei Yang, Jianming Zhang, Eli Shechtman, and Huchuan Lu in *High-Resolution Image Inpainting with Iterative Confidence Feedback and Guided Upsampling*, arXiv:2005.11742 (2020) or as described by Shengyu Zhao, Jonathan Cui, Yilun Sheng, Yue Dong, Xiao Liang, Eric I. Chang, and Yan Xu in *Large Scale Image Completion via Co-Modulated Generative Adversarial Networks*, arXiv: 2103.10428 (2021). As shown, the binary mask 304 indicates areas of masked pixels (e.g., pixels to be replaced during inpainting) in black and areas of unmasked pixels (e.g., pixels to persist or be left unaffected during inpainting) in white.

In addition to identifying the digital image 302 and the binary mask, the panoptic inpainting system 102 identifies a panoptic segmentation map 306. To elaborate, in some embodiments, the panoptic inpainting system 102 receives user interaction to generate a panoptic segmentation map from the client device 108. For instance, the panoptic inpainting system 102 receives user interaction via a panoptic inpainting interface to select a panoptic label element and further receives user interaction to draw and label the panoptic segmentation map 306.

In some embodiments, the panoptic inpainting system 102 generates the panoptic segmentation map 306. In particular, the panoptic inpainting system 102 utilizes a neural network, such as a panoptic segmentation neural network to generate the panoptic segmentation map 306. Indeed, the panoptic inpainting system 102 utilizes a segmentation neural network to predict edges or boundaries for different regions of pixels within a digital image (e.g., the digital image 302). In addition, the panoptic inpainting system 102 utilizes the segmentation neural network to predict labels corresponding to the different regions separated by the boundaries. In some cases, the panoptic inpainting system 102 utilizes a (panoptic) segmentation neural network as described by Yanwei Li, Henghsuang Zhao, Xiaojuan Qi, Liwei Wang, Zeming Li, Jian Sun, and Jiaya Jia in *Fully Convolutional Networks for Panoptic Segmentation*, Proceedings of the IEEE/CVF Conf. on Computer Vision and Pattern Recognition, 214-23 (2021).

In certain embodiments, to generate the panoptic segmentation map 306 for the digital image 302, the panoptic inpainting system 102 first preliminarily inpaints the hole or the designated area of the digital image 302. Indeed, to determine the panoptic segmentation for the missing pixels of the digital image 302, the panoptic inpainting system 102 first generates pixels from which to determine the panoptic segmentation. For example, the panoptic inpainting system 102 utilizes an image generator neural network (e.g., a preliminary inpainting neural network) to generate an intermediate digital image by inpainting the digital image 302. In some cases, the panoptic inpainting system 102 utilizes a particular image generator neural network to generate the intermediate digital image (e.g., a preliminarily inpainted version of the digital image 302), such as the cascaded modulation GAN ("CM-GAN") described by Haitian Zheng, Zhe Lin, Jingwan Lu, Scott Cohen, Eli Shechtman, Connelly Barnes, Jianming Zhang, Ning Xu, and Sohrab Amirghodsi in U.S. patent application Ser. No. 17/661,985, filed May 4, 2022, entitled *Digital Image Inpainting Utilizing a Cascaded Modulation Inpainting Neural Network*, which is incorporated herein by reference in its entirety. From the intermediate digital image, the panoptic inpainting system 102 then determines the panoptic segmentation map 306 as described.

As illustrated in FIG. 3, the panoptic inpainting system 102 utilizes the panoptic segmentation map 306, as well as the digital image 302 and the binary mask 304, as input into the panoptic inpainting neural network 312. In some cases, the panoptic inpainting system 102 does not directly utilize the panoptic segmentation map 306 as input, but instead converts or decomposes the panoptic segmentation map into constituent components to capture panoptic information (e.g., using multiple channels for different components of the panoptic information). Indeed, the panoptic inpainting system 102 generates the panoptic segmentation map 306 to include components such as fine-grained semantics annotation and instance-level contour (e.g., a semantic label map and an edge map, respectively), in accordance with the panoptic segmentation described by Alexander Kirillov, Kaiming He, Ross Girshick, Carsten Rother, and Piotr Dollár in *Panoptic Segmentation*, Proceedings of the IEEE/CVF Conf. on Computer Vision and Pattern Recognition, 9404-13 (2019). Thus, the panoptic inpainting system 102 decomposes the panoptic segmentation map 306 into constituent components for analysis by the panoptic inpainting neural network 312.

Specifically, the panoptic inpainting system 102 generates or determines a label map 308 and an edge map 310 from the panoptic segmentation map 306. Indeed, the panoptic inpainting system 102 determines a label map 308 that reflects or indicates a layout of semantic labels at various pixel coordinates. Additionally, the panoptic inpainting system 102 determines an edge map 310 that reflects or indicates pixel locations of edges or boundaries between regions of the panoptic segmentation map 306 (e.g., to distinguish between overlapping instances of a commonly shared semantic label). In one or more embodiments, the panoptic inpainting system 102 defines a panoptic segmentation map P at each pixel i as a tuple $(l_i, z_i)$, where $l_i \in \{0, \ldots, L-1\}$ represents the semantic label of a pixel i and where $z_i \in \mathbb{N}$ represents a corresponding instance identification. In addition, the panoptic inpainting system 102 converts the panoptic segmentation map P into a semantic label map L and a binary edge map E.

As further illustrated in FIG. 3, the panoptic inpainting system 102 utilizes the panoptic inpainting neural network 312 to generate an inpainted digital image 314. Specifically, the panoptic inpainting system 102 utilizes the panoptic inpainting neural network 312 to generate the inpainted digital image 314 from the digital image 302, the binary mask 304, and/or the panoptic segmentation map 306 (or its constituent components, the label map 308 and the edge map 310). In some embodiments, the panoptic inpainting neural network 312 is conceptually based on conditional GANs, as described by Mehdi Mirza and Simon Osindero in *Conditional Generative Adversarial Nets*, arXiv: 1411.1784 (2014).

To generate the inpainted digital image, the panoptic inpainting system 102 utilizes a generator G of the panoptic inpainting neural network 312. Specifically, the panoptic inpainting system 102 generates the inpainted digital image 314 according to the following:

$$\hat{X} = G(X \odot (1-M), M, L, E)$$

where X represents a complete digital image (e.g., a complete version of the digital image 302), $X \odot (1-M)$ represents the digital image 302, $\hat{X}$ represents the inpainted digital image 314, M represents the binary mask 304, L represents the label map 308, and E represents the edge map 310. As shown, the inpainted digital image 314 depicts realistic, semantically consistent replacement pixels filling the designated region of the digital image 302 (e.g., the area of missing pixels). Indeed, the panoptic inpainting system 102 utilizes the panoptic inpainting neural network 312 to inpaint the various portions of the designated area within the digital image 302 using replacement pixels that match corresponding panoptic labels.

Figure 4:
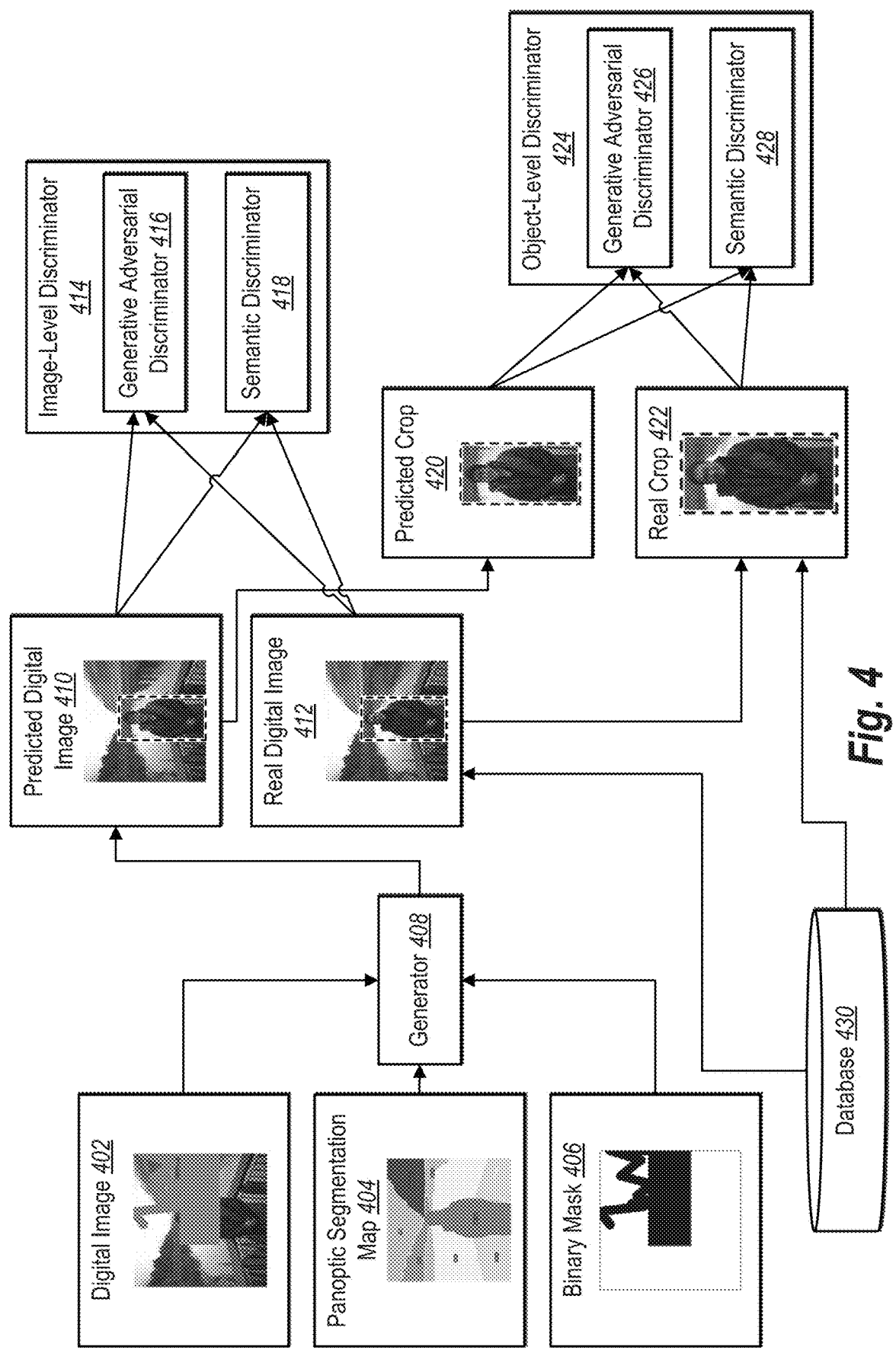
FIG. 4 illustrates an example training process for learning parameters of a neural network utilizing a semantic discriminator in accordance with one or more embodiments.

As mentioned above, in certain described embodiments, the panoptic inpainting system 102 learns parameters for a panoptic inpainting neural network utilizing a semantic discriminator. In particular, the panoptic inpainting system 102 utilizes a semantic discriminator to train, build, or learn parameters for, various neural networks including generative neural networks such as a panoptic inpainting neural network. FIG. 4 illustrates an example diagram for training a neural network utilizing a semantic discriminator in accordance with one or more embodiments.

As illustrated in FIG. 4, the panoptic inpainting system 102 accesses or receives a digital image 402. As shown, the digital image 402 includes a designated area (as defined by user interaction via a client device or otherwise determined) of pixels to be replaced, represented by the gray portion of removed, occluded, or obfuscated pixels. In addition, the panoptic inpainting system 102 identifies, generates, or receives a panoptic segmentation map 404 which defines a panoptic layout for generating pixels and guiding the inpainting process. The panoptic inpainting system 102 further identifies, generates, or receives a binary mask 406 which defines or reflects the designated area of pixels to be replaced within the digital image 402.

Based on identifying the digital image 402, the panoptic segmentation map 404, and the binary mask 406, the panoptic inpainting system 102 utilizes a generator 408 (e.g., a generator neural network as described above) to generate a predicted digital image 410. More particularly, the panoptic inpainting system 102 utilizes the generator 408 to generate replacement pixels for filling the designated area of the digital image 402 (whose area is defined by the binary mask 406) and corresponding to one or more panoptic labels following the guidance of the panoptic segmentation map 404. As shown, the predicted digital image 410 includes replacement pixels filling in the designated area, where the replacement pixels follow the panoptic labels of the panoptic segmentation map 404 for the different portions.

In some embodiments, the generator 408 has a particular architecture, such as the generator architecture of the CM-GAN described in U.S. patent application Ser. No. 17/661,985 cited above. In some cases, the panoptic inpainting system 102 utilizes a modified CM-GAN architecture to take a semantic label map and an edge map as inputs. Indeed, to generate the predicted digital image 410 utilizing input data compatible with the generator 408 (e.g., the CM-GAN generator), the panoptic inpainting system 102 decomposes the panoptic segmentation map 404 into two components: a semantic label map that defines labels for the various portions of the panoptic segmentation map 404 and an edge map that defines the boundaries or edges between the panoptic labels. More specifically, the panoptic inpainting system 102 passes the semantic label map to an embedding layer and then performs a normalization technique (e.g., $\ell_2$ normalization) to produce a normalized semantic embedding. The panoptic inpainting system 102 thus generates the predicted digital image 410 according to the following mathematical representation:

$$\hat{X}=G(X\odot(1-M),M,S,E)$$

where $\hat{X}$ represents the predicted digital image 410, G represents the generator 408, X represents a complete digital image (e.g., a complete version of the digital image 402), $X\odot(1-M)$ represents the digital image 402, S represents a normalized semantic embedding, and E represents an edge map. In some cases, the combination or concatenation of M,S,E is referred to as a panoptic condition. Indeed, the panoptic inpainting system 102 concatenates the inputs and generates the predicted digital image 410 from the concatenation.

As part of training a neural network (e.g., a neural network that includes the generator 408), the panoptic inpainting system 102 further utilizes an image-level discriminator 414 and an object-level discriminator 424. To generate realistic digital images, the panoptic inpainting system 102 utilizes both image-level and object-level discriminators to prevent or reduce unwanted focus on artifacts or imperceptible features of digital images. Indeed, by using both the image-level discriminator 414 and the object-level discriminator, the panoptic inpainting system 102 learns parameters for generating realistic digital images that also conform to a complex semantic layout, even for individual objects or regions of a digital image.

To elaborate on the image-level discriminator 414, the image-level discriminator 414 includes a generative adversarial discriminator 416 and a semantic discriminator 418. In one or more embodiments, the image-level discriminator 414 generates a realism prediction based on an entirety of the predicted digital image 410. More specifically, the image-level discriminator 414 compares the predicted digital image 410 with a real digital image 412 (e.g., a real digital image stored within a database 430 and designated as corresponding to, or representing completed version of, the digital image 402) to generate a realism prediction of how likely the predicted digital image 410 is to be a real image from the database 430.

As shown, the image-level discriminator 414 includes two constituent discriminators: a generative adversarial discriminator 416 and a semantic discriminator 418. Indeed, the panoptic inpainting system 102 utilizes the generative adversarial discriminator 416 to generate a first realism score and further utilizes the semantic discriminator 418 to generate a second realism score. The panoptic inpainting system 102 further combines the realism score of the generative adversarial discriminator 416 and the realism score of the semantic discriminator 418 to determine a realism score for the image-level discriminator 414. In some cases, the generative adversarial discriminator 416 has a particular architecture, such as that of a StyleGAN discriminator as described by Tero Karras, Samuli Laine, Miika Aittala, Janne Hellsten, Jaakko Lehtinen, and Timo Aila in *Analyzing and Improving the Image Quality of StyleGAN*, CVPR (2020). In some embodiments, the panoptic inpainting system 102 utilizes the generative adversarial discriminator 416 to generate an image-level realism score in accordance with the following equation:

$$\hat{y}_g=D_g(\hat{X},M,S,E)$$

where $\hat{y}_g$ represents the image-level realism score, $D_g$ represents the generative adversarial discriminator 416, $\hat{X}$ represents the predicted digital image 410, and M,S,E represents the panoptic condition described above.

In addition, the panoptic inpainting system 102 utilizes the semantic discriminator 418 to determine an image-level semantic realism score, as given by the following equation:

$$\hat{y}_s=D_s(\hat{X},M,S,E)$$

where $\hat{y}_s$ represents the image-level semantic realism score, $D_s$ represents the semantic discriminator 418, $\hat{X}$ represents the predicted digital image 410, and M,S,E represents the panoptic condition described above. Additional detail regarding the architecture of the semantic discriminator 418 (and the semantic discriminator 428) is provided below with reference to FIG. 5.

To elaborate on the object-level discriminator 424, the object-level discriminator 424 includes a generative adversarial discriminator 426 and a semantic discriminator 428, like the image-level discriminator 414. In one or more embodiments, the object-level discriminator 424 generates a realism prediction based on a portion of the predicted digital image 410. More specifically, the panoptic inpainting system 102 generates a crop of the predicted digital image 410 to focus on a particular object or region of pixels—e.g., the predicted crop 420. In certain embodiments, the panoptic inpainting system 102 generates the predicted crop 420 to have rectangular dimensions and further utilizes a binary mask to distinguish between foreground pixels and background pixels of the crop (e.g., to only generate a realism score for the foreground pixels). For instance, the panoptic inpainting system 102 generates a binary mask to mask out the pixels around the individual depicted in the predicted crop 420 so that only the pixels representing the individual remain.

As shown, the object-level discriminator 424 determines one or more realism predictions for the predicted crop 420 in relation to a real crop 422 (e.g., a crop of a real digital image stored within the database 430 and designated as corresponding to, or representing completed version of, the digital image 402). Indeed, the panoptic inpainting system 102 generates a realism prediction of how likely the predicted digital image 410 is to be a real crop from the database 430 (or a crop of a real image from the database 430). In some cases, the panoptic inpainting system 102 generates multiple crops and determines realism predictions for each crop or corresponding object. Thus, the panoptic inpainting system 102 uses object-level alignment to improve realism and semantic conformity of generated images.

As shown, the object-level discriminator 424 includes two constituent discriminators: a generative adversarial discriminator 426 and a semantic discriminator 428. Indeed, the panoptic inpainting system 102 utilizes the generative adversarial discriminator 426 to generate a first realism score and further utilizes the semantic discriminator 428 to generate a second realism score for the predicted crop 420. The panoptic inpainting system 102 further combines the realism score of the generative adversarial discriminator 416 and the realism score of the semantic discriminator 428 to determine a realism score for the object-level discriminator 424. In some cases, the generative adversarial discriminator 426 has a particular architecture, such as that of the generative adversarial discriminator 416. Similarly, the semantic discriminator 428 has an architecture like that of the semantic discriminator 418 which is described in further detail below in relation to FIG. 5.

In one or more embodiments, the panoptic inpainting system 102 generates an object-level realism score according to the following equation:

$$\hat{y}^{obj} = D^{obj}(\hat{X}_\alpha, M_\alpha, L_\alpha, E_\alpha, I_\alpha)$$

where $\hat{y}^{obj}$ represents the object-level realism score (e.g., how likely the predicted crop 420 is actually the real crop 422), $D^{obj}$ represents the generative adversarial discriminator 426, $\hat{X}_\alpha$ represents the predicted crop 420 of bounding box $b=(x_0,y_0,x_1,y_1)$, $M_\alpha$ represents a cropped binary mask (e.g., a cropped portion of the binary mask 406), $L_\alpha$ represents a cropped label map, $E_\alpha$ represents a cropped edge map, and $I_\alpha$ represents a crop-level binary mask separating foreground pixels and background pixels of the predicted crop 420 (e.g., to remove pixels around a depicted object to thus reflect the shape of the object). In some cases, the combination or concatenation of $M_\alpha, L_\alpha, E_\alpha, I_\alpha$ is considered an object-level panoptic condition. Indeed, the panoptic inpainting system 102 determines each of the components of the equation by cropping the predicted digital image 410 and the corresponding maps and masks.

In certain embodiments, the panoptic inpainting system 102 generates an object-level semantic realism score according to the following equation:

$$\hat{y}_s^{obj} = D_s^{obj}(\hat{X}_\alpha, M_\alpha, L_\alpha, E_\alpha, I_\alpha)$$

where $\hat{y}_s^{obj}$ represents the object-level semantic realism score (e.g., how likely the predicted crop 420 semantically matches the real crop 422), $D_s^{obj}$ represents the semantic discriminator 428, and the other terms are as defined above. In some cases, the panoptic inpainting system 102 further combines realism scores to generate an overall realism prediction. To elaborate, the panoptic inpainting system 102 combines the object-level realism score and the object-level semantic realism score to determine an overall object-level realism score. In addition, the panoptic inpainting system 102 combines the image-level realism score with the image-level semantic realism score to determine an overall image-level realism score. Further, the panoptic inpainting system 102 combines the overall object-level realism score with the overall image-level realism score to determine an overall realism prediction.

Based on an overall realism prediction, the panoptic inpainting system 102 determines one or more losses that dictate how the panoptic inpainting system 102 adjusts parameters of a neural network (e.g., the generator 408, the image-level discriminator 414, the object-level discriminator 424, and/or other neural networks) over multiple iterations to improve accuracy. Indeed, the panoptic inpainting system 102 utilizes a particular training objective to reduce certain measures of loss until the measures of loss satisfy respective thresholds. For example, the panoptic inpainting system 102 determines adversarial losses for the various discriminators, including the generative adversarial discriminator 416, the semantic discriminator 418, the generative adversarial discriminator 426, and the semantic discriminator 428.

To elaborate, the panoptic inpainting system 102 determines four non-saturating adversarial losses, one for the generative adversarial discriminator 416, one for the semantic discriminator 418, one for the generative adversarial discriminator 426, and one for the semantic discriminator 428. For instance, panoptic inpainting system 102 determines adversarial losses according to the following equation:

$$L_{adv} = \sum_{D \in \mathcal{D}} \log D(X) + \log(-D(\hat{X}))$$

where $L_{adv}$ represents the overall adversarial loss across all four discriminators $\mathcal{D} = \{D, D_s, D^{obj}, D_s^{obj}\}$, and where the other terms are as defined above.

In addition to adversarial loss, the panoptic inpainting system 102 further determines and utilizes one or more reconstruction losses. For example, to improve the generated textures while stabilizing the training process, the panoptic inpainting system 102 incorporates a perceptual loss as a reconstruction loss. To determine a perceptual/reconstruction loss, in some embodiments, the panoptic inpainting system 102 compares a generated digital image (e.g., the predicted digital image 410 or the predicted crop 420) with a real digital image (e.g., the real digital image 412 or the real crop 422). For example, the panoptic inpainting system 102 compares pixels of the predicted digital image 410 with pixels of the real digital image 412 to determine (pixel-wise) distances between them in an embedding space. As another example, the panoptic inpainting system 102 compares pixels of the predicted crop 420 with pixels of the real crop 422 to determine (pixel-wise) distances between them in an embedding space.

In one or more embodiments, the panoptic inpainting system 102 utilizes a reconstruction loss given by the following equation:

$$L_{rec} = \sum_{l=1}^{\mathcal{L}} \|\Phi^{(l)}(\hat{X}) - \Phi^{(l)}(X)\|_1$$

where $L_{rec}$ represents the reconstruction loss and $\Phi^{(l)}$ is a feature representation of a pretrained network at a scale of $l \in \{1, \ldots, \mathcal{L}\}$ where $\mathcal{L} = 4$. In some cases, the pretrained network is a pretrained segmentation model with a high receptive field to improve large mask inpainting. For example, the pretrained network is a LaMa network as described by Roman Suvorov, Elizaveta Logacheva, Anton Mashikin, Anastasia Remizova, Arsenii Ashukha, Aleksei Silvestrov, Naejin Kong, Harshith Goka, Kiwoong Park, and Victor Lempitsky in *Resolution-Robust Large Mask Inpainting with Fourier Convolutions*, arXiv:2109:07161 (2021).

As mentioned, the panoptic inpainting system 102 updates parameters of a neural network based on the losses described above. In particular, the panoptic inpainting system 102 determines losses for a first iteration of a training process, adjusts neural network parameters (e.g., weights and biases of the generator 408 and/or other neural networks), and performs a subsequent iteration with new images using the adjusted parameters. The panoptic inpainting system 102 repeats the training process until one or more measures of loss (e.g., adversarial loss or reconstruction loss) satisfy a threshold measure of loss.

Figure 5:
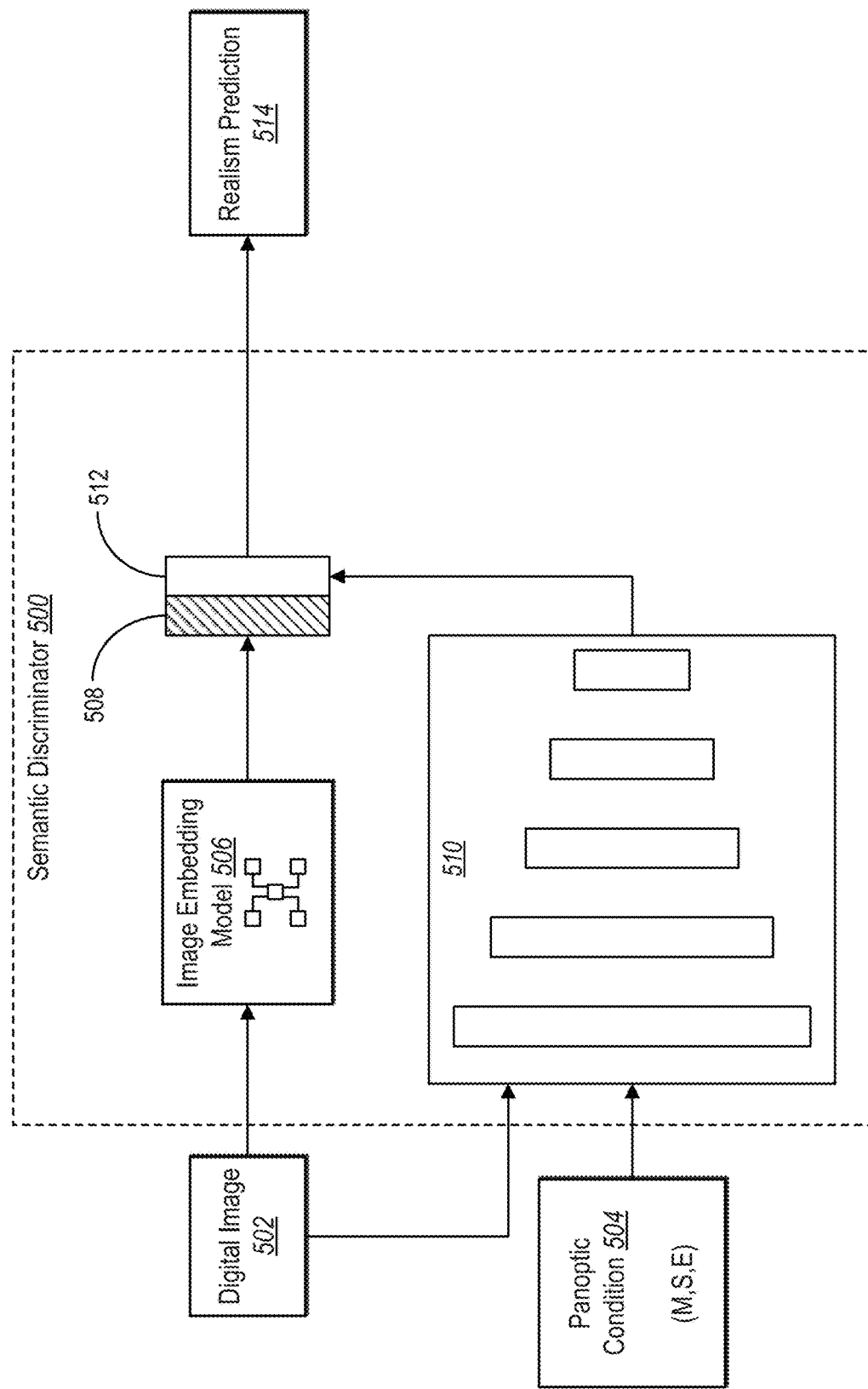
FIG. 5 illustrates an example architecture for a semantic discriminator in accordance with one or more embodiments.

As mentioned above, in certain described embodiments, the panoptic inpainting system 102 utilizes one or more semantic discriminators as part of a training process. In particular, the panoptic inpainting system 102 utilizes a semantic discriminator having a particular architecture for determining losses at the image level and at the object level. FIG. 5 illustrates an example diagram of the architecture for a semantic discriminator in accordance with one or more embodiments.

As illustrated in FIG. 5, the semantic discriminator 500 generates a realism prediction 514 from a digital image 502 and a panoptic condition 504. Indeed, the semantic discriminator 500 utilizes various neurons and layers to generate the realism prediction 514 to indicate a measure of semantic realism associated with the digital image 502. The semantic discriminator 500 generates the realism prediction 514 according to a panoptic condition 504 that includes or represents a binary mask M, a normalized semantic embedding S of a segmentation map (e.g., a panoptic segmentation map), and an edge map E for the segmentation map.

As shown, the semantic discriminator 500 includes an image embedding model 506. In particular, the image embedding model 506 is (or includes) an encoder that encodes or generates an image embedding 508 from the digital image 502. In particular, the image embedding model 506 generates the image embedding 508 (e.g., a vector representation of the digital image 502) to represent the digital image 502 in an embedding space. In some cases, the image embedding model 506 has a particular architecture, such as that of a pretrained contrastive language-image pretraining ("CLIP") model as described by Alec Radford, Jong Wook Kim, Chris Hallacy, Aditya Ramesh, Gabriel Goh, Sandhini Agarwal, Girish Sastry, Amanda Askell, Pamela Mishkin, and Jack Clark in *Learning Transferrable Visual Models from Natural Language Supervision*, Int'l Conf. on Machine Learning, 8748-63 (2021). By leveraging the semantic knowledge of the image embedding model 506, the semantic discriminator 500 better determines semantic realism as part of the realism prediction 514.

As further illustrated in FIG. 5, the semantic discriminator 500 includes another encoder 510 that is made up of a series or a set of convolutional layers. In particular, the encoder 510 analyzes a panoptic condition 504 (e.g., a binary mask M, a normalized semantic embedding S, and an edge map E) together with the digital image 502 to generate or encode a semantic image embedding 512. The semantic image embedding 512 is an encoded representation of a combination of the digital image 502 and the panoptic condition 504, including image information and semantic layout information. Specifically, the encoder 510 encodes the panoptic condition 504 based on strided convolution into a vector representation in an embedding space corresponding to (e.g., matching the dimensions of) the embedding space of the image embedding 508. Indeed, the encoder 510 generates the semantic image embedding 512 to represent semantic characteristics of the digital image 502 according to the binary mask M, the normalized semantic embeddings S (e.g., from a panoptic segmentation map), and the edge map E (e.g., from a panoptic segmentation map).

In addition, the semantic discriminator 500 combines (e.g., concatenates) the image embedding 508 with the semantic image embedding 512. As shown, the semantic discriminator 500 concatenates the image embedding 508 and the semantic image embedding 512 and further generates the realism prediction 514 based on the concatenated result. For instance, the semantic discriminator 500 generates the realism prediction 514 to indicate whether the digital image 502 is real or not (or how likely it is that the digital image 502 is real).

To generate the realism prediction 514, in some cases, the semantic discriminator 500 uses one or more neural network layers. For example, the semantic discriminator 500 includes layers to generate an object-level semantic realism prediction or an image-level semantic realism prediction (e.g., depending on where the semantic discriminator 500 is located within a neural network architecture). In some cases, the semantic discriminator 500 includes one or more output layers that generate, from the concatenation of the image embedding 508 and the semantic image embedding 512, the realism prediction 514 in the form of a realism score that indicates a probability or a likelihood that the digital image 502 is real.

As mentioned above, in certain embodiments, the panoptic inpainting system 102 generates and provides various user interfaces for inpainting a digital image utilizing panoptic guides. In particular, the panoptic inpainting system 102 generates and provides a panoptic inpainting interface that includes selectable elements for generating inpainted digital images, modifying a panoptic segmentation map, and/or performing other operations. FIGS. 6A-6D illustrate example panoptic inpainting interfaces for inpainting digital images in accordance with one or more embodiments.

Figure 6A:
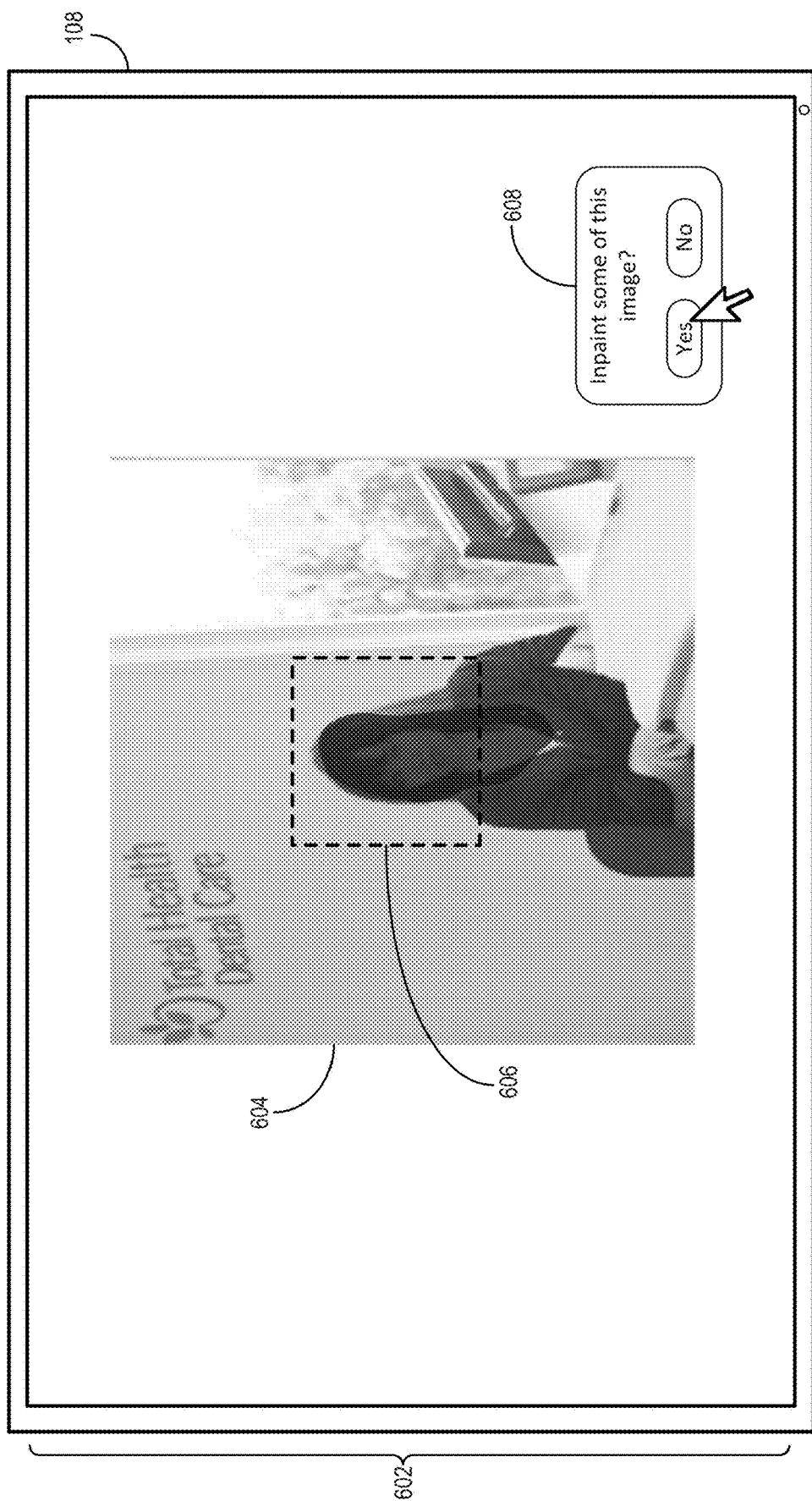
FIGS. 6A-6D illustrate an example sequence of panoptic inpainting interfaces for generating inpainting digital images in accordance with one or more embodiments.
Figure 6B:
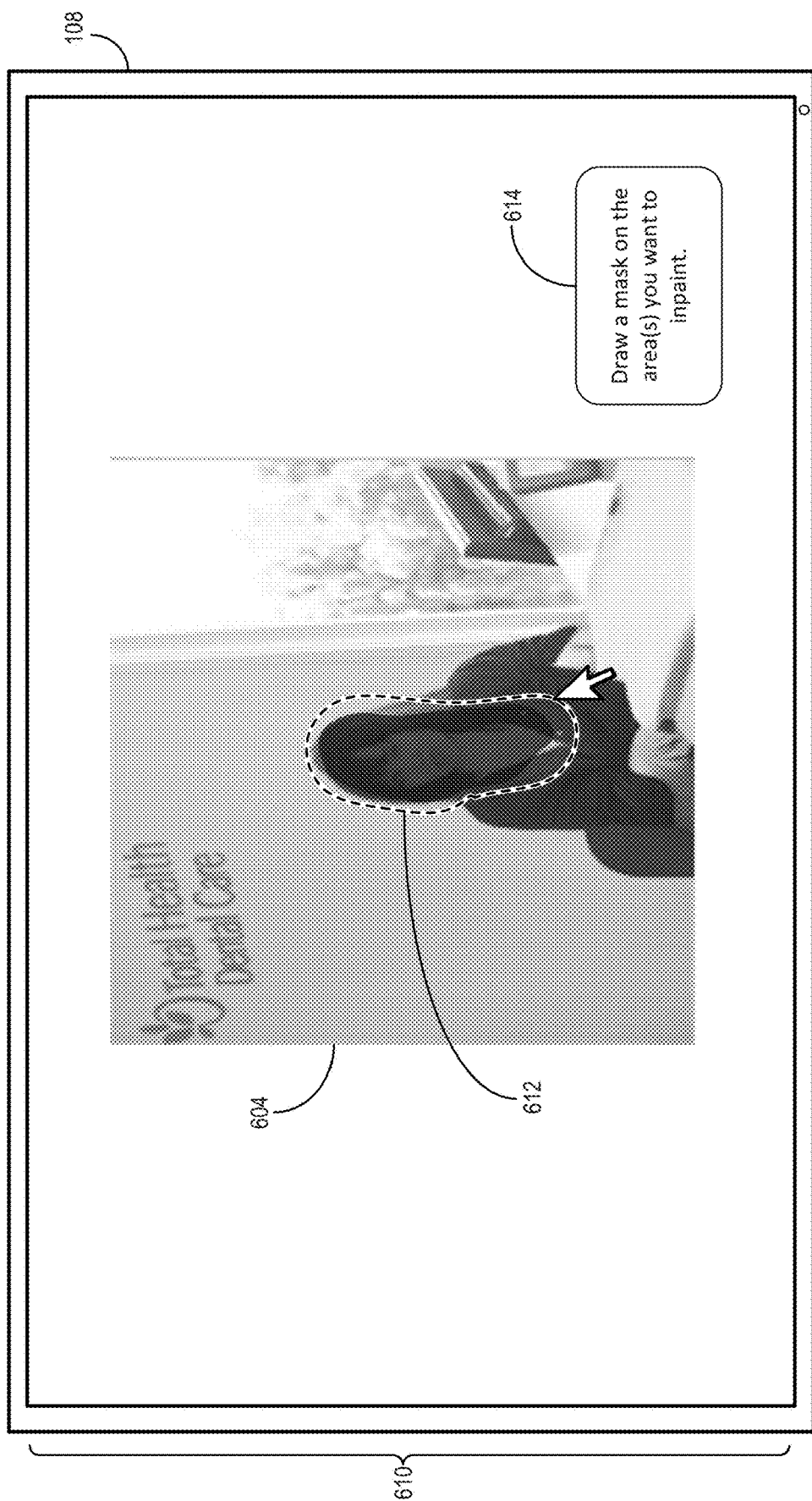

As illustrated in FIG. 6A, the client device 108 displays a panoptic inpainting interface 602 that includes a digital image 604. In addition, the panoptic inpainting interface 602 includes a designated area indicator 606 that highlights or indicates a designated area of pixels within the digital image 604. For instance, upon receiving or identifying the digital image 604, the panoptic inpainting system 102 analyzes (e.g., automatically without user interaction prompting the analysis) the digital image 604 to identify a designated area of pixels that could be replaced. Specifically, the panoptic inpainting system 102 identifies or detects blurry pixels, missing pixels, off-color pixels, low-quality pixels, poorly edited pixels, or pixels that are otherwise flawed or inconsistent with the digital image 604 and which could be replaced to improve the overall image quality.

Based on detecting the designated area, the panoptic inpainting system 102 generates and provides a designated area indicator 606 to indicate the designated area of the digital image 604. In addition, the panoptic inpainting system 102 generates and provides an inpainting element 608 selectable to inpaint the digital image 604. For example, the panoptic inpainting system 102 provides the inpainting element 608 based on detecting the designated area of pixels to be replaced within the digital image 604. Thus, in response to receiving user interaction selecting the inpainting element 608 (e.g., selecting the "yes" option within the inpainting element 608), the panoptic inpainting system 102 performs an inpainting operation to inpaint the designated area of the digital image 604 utilizing a panoptic segmentation, in accordance with this disclosure.

In some embodiments, the panoptic inpainting system 102 includes the client device 108 as part of the inpainting process, soliciting or accepting input or guidance for how to inpaint the digital image 604 along the way. For example, based on receiving an indication of user interaction to inpaint the digital image 604, the panoptic inpainting system 102 provides the interface illustrated in FIG. 6B. That is, the panoptic inpainting system 102 provides a panoptic inpainting interface 610 for generating or drawing a binary mask to more specifically define or edit the designated area of the digital image 604. Indeed, the panoptic inpainting interface 610 includes a mask input prompt 614 prompting the user of the client device 108 to input or draw a mask (e.g., a binary mask or a soft mask with alpha values for more nuanced distinction of pixels to include or exclude) around pixels to inpaint. As shown, the panoptic inpainting system 102 receives user interaction defining a binary mask 612 around the designated area of the digital image 604 or elsewhere within the digital image. In some cases, the user may elect to forego drawing a binary mask and may instead prompt the panoptic inpainting system 102 to proceed with inpainting the digital image 604 based on the previously determined designated area.

Figure 6C:
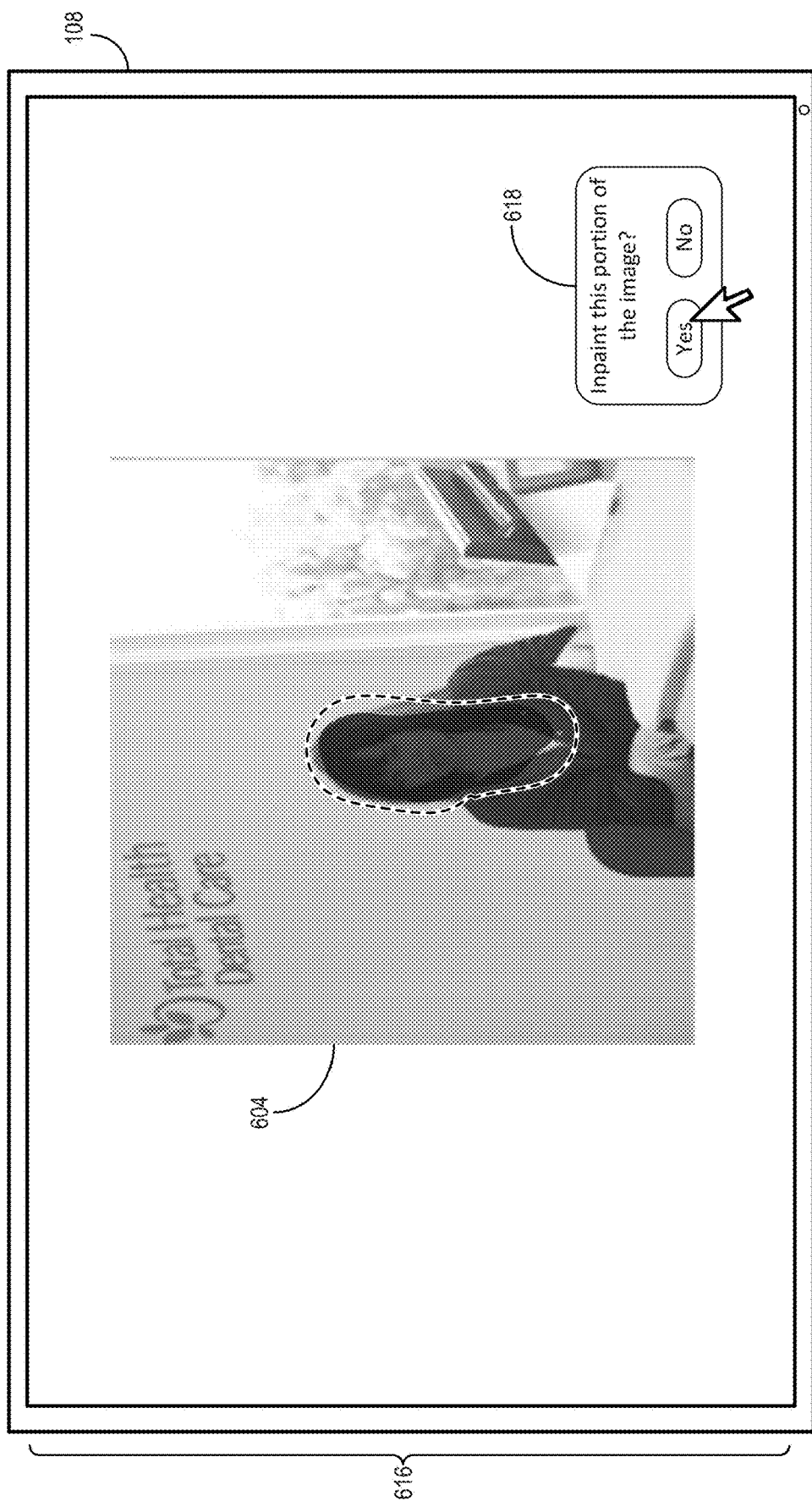

Upon receiving the input for the binary mask 612, in some embodiments, the panoptic inpainting system 102 further provides an inpainting element to inpaint the selected portion. For example, as illustrated in FIG. 6C, the panoptic inpainting system 102 generates and provides a panoptic inpainting interface 616 that includes the digital image 604 and a panoptic inpainting element 618 selectable to inpaint the pixels within the binary mask 612 (or within a designated area determined automatically).

Based on receiving an indication of user interaction selecting the panoptic inpainting element 618 (e.g., a selection of the "yes" option), the panoptic inpainting system 102 generates an inpainted digital image from the digital image 604 utilizing a panoptic inpainting neural network as described herein. For instance, the panoptic inpainting system 102 determines or identifies a panoptic segmentation map associated with the digital image 604 and generates replacement pixels to fill the designated area in accordance with the panoptic segmentation map.

Figure 6D:
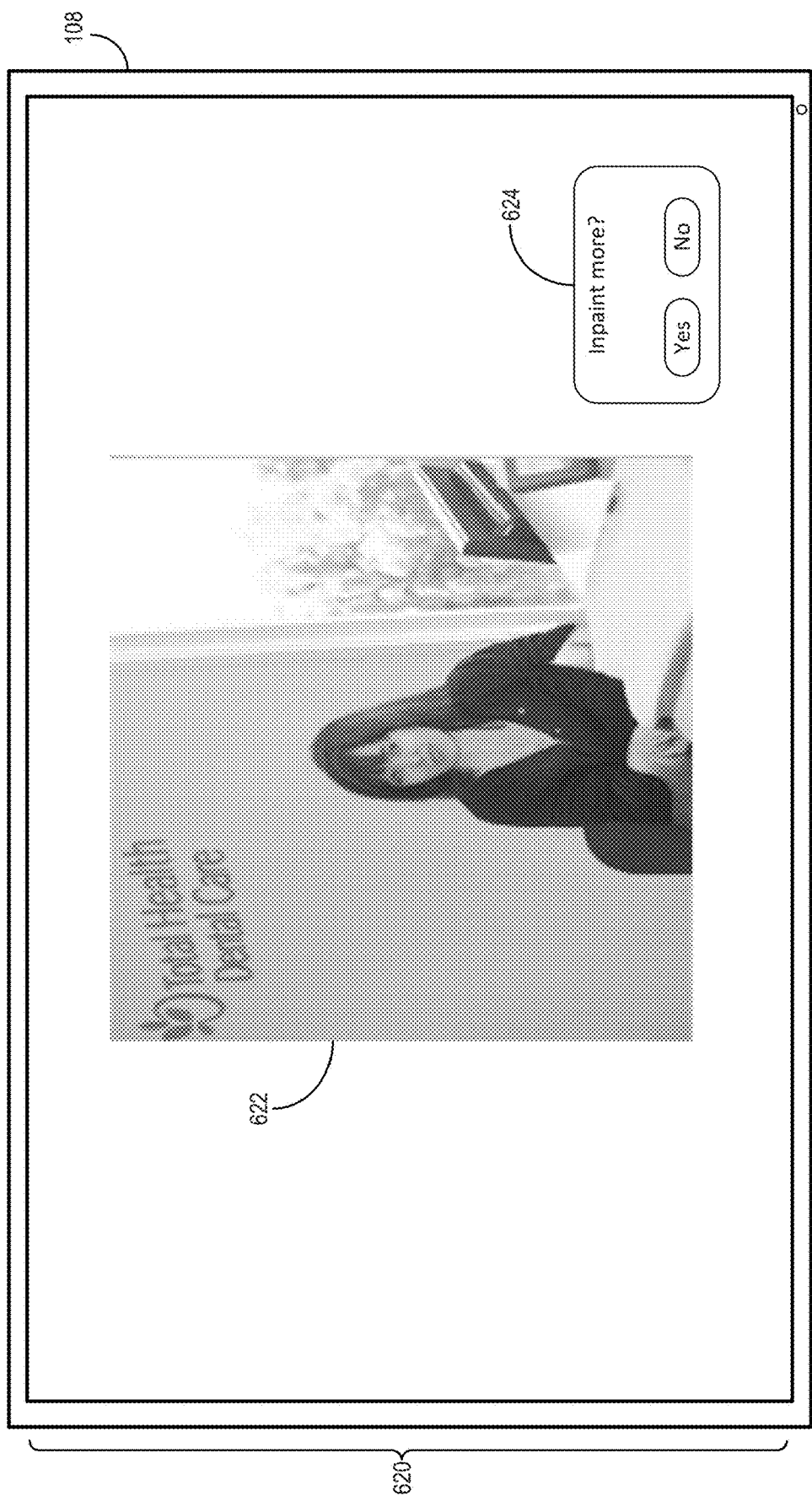

As illustrated in FIG. 6D, for example, the panoptic inpainting system 102 generates the inpainted digital image 622 from the digital image 604. Indeed, the panoptic inpainting system 102 generates and provides the panoptic inpainting interface 620 for display on the client device 108. As shown, the panoptic inpainting interface 620 includes or depicts the inpainted digital image 622 in addition to a panoptic inpainting element 624 that is selectable to further inpaint or modify the inpainted digital image 622 (e.g., by modifying a panoptic segmentation map and/or a binary mask that guided the panoptic inpainting neural network to generate the inpainted digital image 622).

As just mentioned, in certain described embodiments, the panoptic inpainting system 102 enables the client device 108 to edit or modify certain aspects of a digital image, including a panoptic segmentation map and/or a binary mask that guide the inpainting process. In particular, the panoptic inpainting system 102 provides panoptic inpainting interfaces that include selectable elements for editing or modifying panoptic segmentation maps, binary masks, and/or other aspects of a digital image. FIGS. 7A-7D illustrate example panoptic inpainting interfaces for generating and modifying inpainted digital images based on edits or modifications to various aspects of digital images in accordance with one or more embodiments.

Figure 7A:
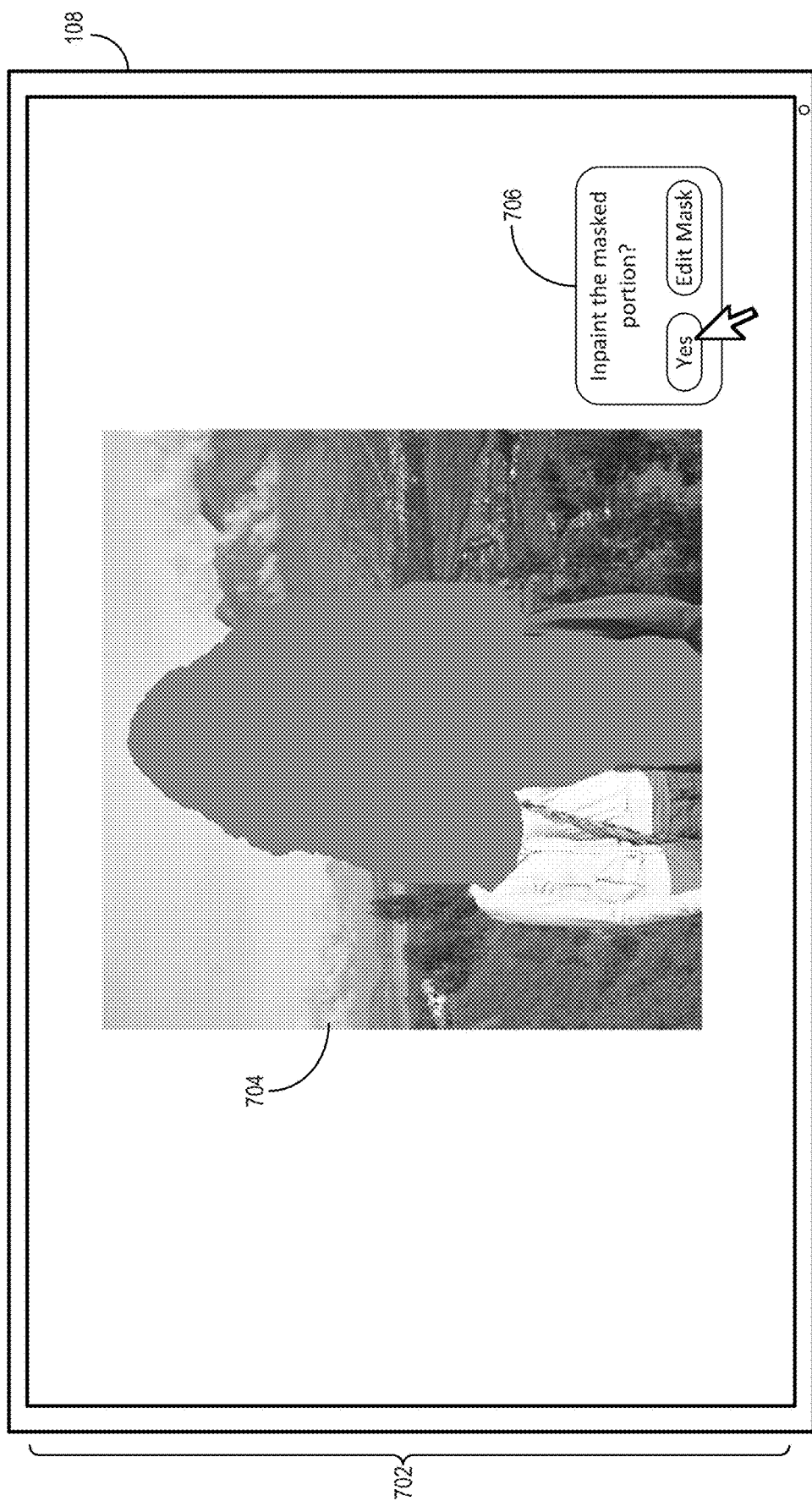
FIGS. 7A-7D illustrate an example sequence of panoptic inpainting interfaces for generating and modifying inpainted digital images and panoptic segmentation maps in accordance with one or more embodiments.

As illustrated in FIG. 7A, the client device 108 displays a panoptic inpainting interface 702 that includes a designated area or a masked portion. Indeed, in some cases, the panoptic inpainting system 102 receives the digital image 704 along with a binary mask from the client device 108 (or from some other source) which indicates the designated area of pixels to inpaint within the digital image 704. As shown, the panoptic inpainting interface 702 further includes a panoptic inpainting element 706 that is selectable to inpaint the designated area (or the masked portion) of the digital image 704.

In some cases, the panoptic inpainting element 706 (or the panoptic inpainting interface 702) includes an image mask element (e.g., represented by the "Edit Mask" button) selectable to edit or modify the binary mask defining the designated area of the digital image 704. Indeed, based on receiving a user interaction selecting the image mask element, the panoptic inpainting system 102 provides one or more elements or tools for a user to define or modify a binary mask associated with the digital image 704. For instance, the panoptic inpainting system 102 provides a mask definition tool for drawing, outlining, or painting an area of a binary mask to define a designated area of pixels to replace within a digital image.

Figure 7B:
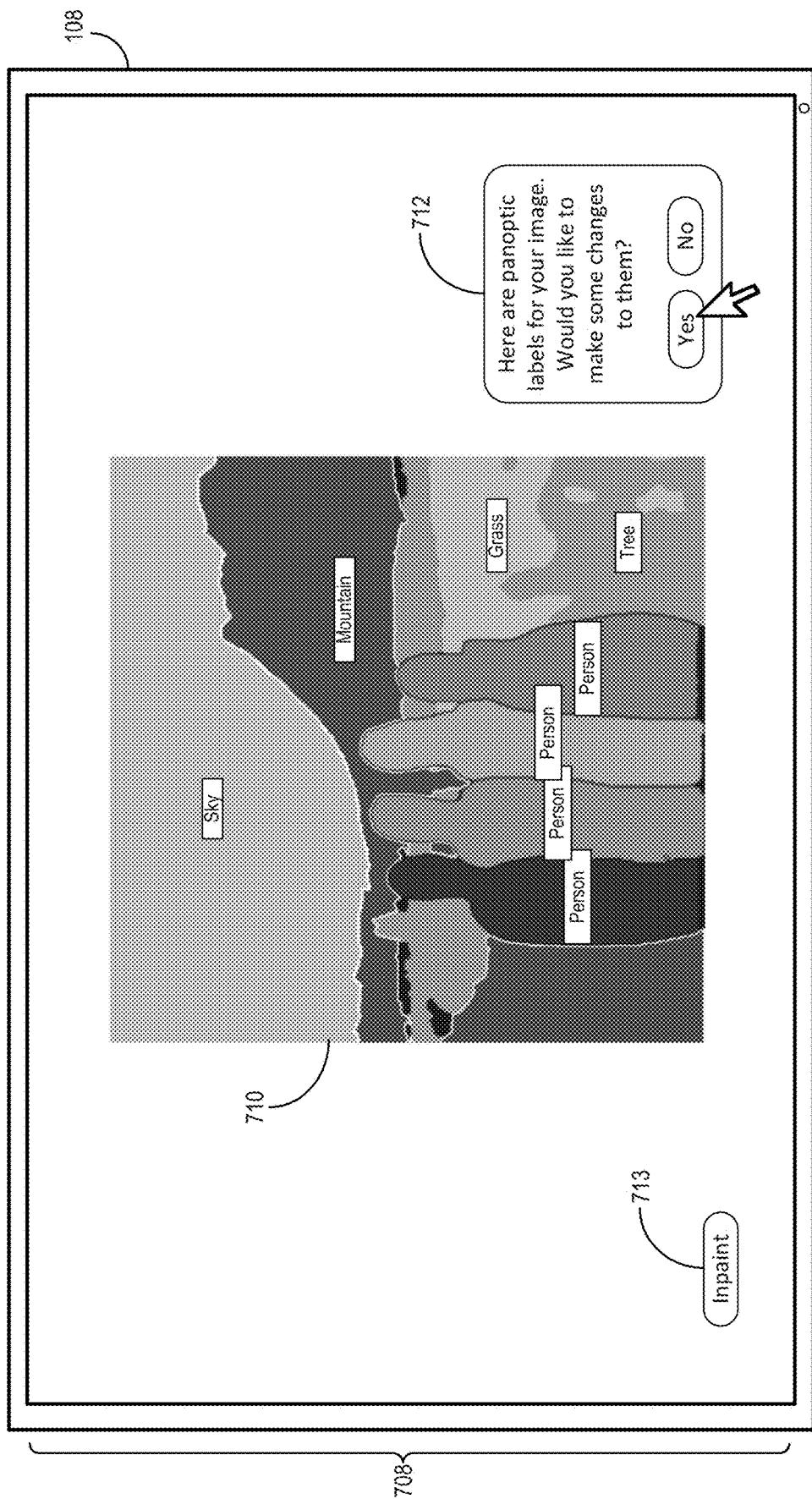

Based on receiving a user interaction selecting the panoptic inpainting element 706, the panoptic inpainting system 102 generates and provides additional user interfaces for receiving input to guide the inpainting process. For example, as illustrated in FIG. 7B, the panoptic inpainting system 102 generates and provides a panoptic inpainting interface 708 that includes panoptic segmentation map 710 delineating regions of a digital image by indicating panoptic labels and boundaries associated with pixel regions of the digital image 704. For example, the panoptic inpainting system 102 generates the panoptic segmentation map 710 (including regions and corresponding labels) utilizing a segmentation neural network. Indeed, the panoptic inpainting system 102 utilizes a segmentation neural network, such as the PanopticFCN network described by Yanwei Li et al., as mentioned above.

In some cases, the panoptic segmentation map 710 is modifiable with user input to change labels and/or boundaries of regions. Indeed, the panoptic inpainting system 102 generates and provides a panoptic label element 712 selectable to modify the panoptic segmentation map 710. The panoptic inpainting interface 708 further includes a panoptic inpainting element 713 selectable to inpaint the digital image 704 according to the panoptic segmentation map 710.

Figure 7C:
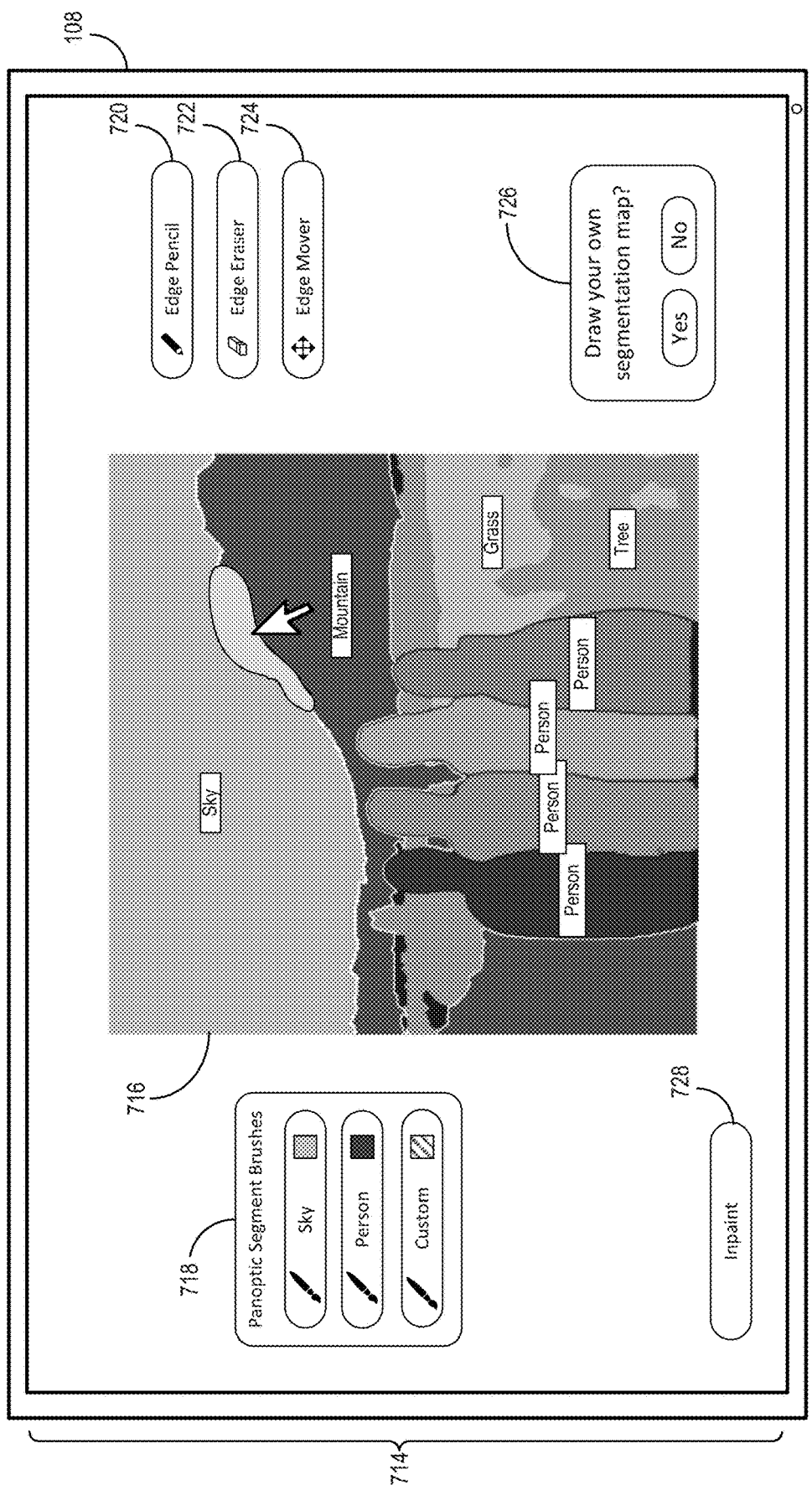

Based on receiving user interaction selecting the panoptic label element 712, the panoptic inpainting system 102 provides additional elements or tools for editing or modifying the panoptic segmentation map 710. Indeed, as illustrated in FIG. 7C, the panoptic inpainting system 102 generates and provides a panoptic inpainting interface 714 that includes a modified panoptic segmentation map 716. Compared to the panoptic segmentation map 710, the modified panoptic segmentation map 716 depicts changes to the mountain region as a user moves the boundary to include more sky pixels in the area near the illustrated cursor. To generate the modified panoptic segmentation map 716, the panoptic inpainting system 102 receives user interaction with one or more tools or elements within the panoptic inpainting interface 714.

As shown, the panoptic inpainting interface 714 also includes or depicts various elements or tools for editing or modifying the panoptic segmentation map 716. For example, the panoptic inpainting system 102 provides panoptic boundary drawing tools, such as panoptic segment brushes 718, an edge pencil 720, an edge eraser 722, and/or an edge mover 724. In some embodiments, the panoptic segment brushes 718 include one or more selectable brush tools for painting or drawings regions corresponding to particular panoptic segments. For instance, the panoptic segment brushes 718 include a sky brush, a person brush, a mountain brush, a grass brush, and/or other label-specific brushes for applicating within a panoptic segmentation map design window. Additionally, the panoptic segment brushes 718 can include a custom brush definable via the client device 108 to have a user-defined color and a user-defined label. In some cases, each of the panoptic segment brushes 718 has its own color corresponding to a respective panoptic label. In some embodiments, the panoptic inpainting system 102 provides the panoptic segment brushes 718 together with a digital image (e.g., the digital image 704) so that the user can paint portions directly onto a designated area of the digital image with desired panoptic labels for inpainting.

In addition, the panoptic inpainting system 102 provides an edge pencil 720. In particular, the edge pencil 720 is selectable to draw boundaries or edges associated with panoptic regions of the panoptic segmentation map 716. For instance, the panoptic inpainting system 102 receives an indication of user interaction selecting the edge pencil 720 and applying the edge pencil 720 to one or more areas of the panoptic segmentation map 716. The panoptic inpainting system 102 can further receive user interaction to input a panoptic label associated with a newly drawn boundary within the panoptic segmentation map 716. In some cases, the panoptic inpainting system 102 provides the edge pencil 720 (and/or the edge eraser 722 and/or the edge mover 724) together with a digital image (e.g., the digital image 704) so that the user can edit panoptic regions of a designated area of pixels to be replaced directly within the digital image.

In some embodiments, the panoptic inpainting system 102 receives input strokes with the edge pencil 720 and/or the panoptic segment brushes 718. For example, the panoptic inpainting system 102 receives input strokes to draw boundaries, edges, or regions of a panoptic segmentation map (e.g., the modified panoptic segmentation map 716). In some cases, the panoptic inpainting system 102 receives user interaction to input labels corresponding to one or more regions of the panoptic segmentation map.

In one or more embodiments, the panoptic inpainting system 102 receives user interaction with the edge pencil 720 or the panoptic segment brushes 718 to add new objects or regions not originally depicted within a designated area of a digital image. For example, the panoptic inpainting system 102 receives user interaction to add people within a designated area where only grass pixels were depicted. As another example, the panoptic inpainting system 102 receives user interaction to add a fifth person to the panoptic segmentation map 716. Based on the user interaction adding a new region, the panoptic inpainting system 102 utilizes a panoptic inpainting neural network to generate replacement pixels corresponding to the new region and inpaints the digital image to include corresponding pixels (e.g., depicting a new object).

As further illustrated in FIG. 7C, the panoptic inpainting system 102 provides an edge eraser 722. In particular, the panoptic inpainting system 102 receives an indication of user interaction with the edge eraser 722. In addition, the panoptic inpainting system 102 receives a user interaction to apply the edge eraser 722 to one or more boundaries or edges within the panoptic segmentation map 716. Based on the user interaction, the panoptic inpainting system 102 removes or erases one or more boundaries within the panoptic segmentation map. In some cases, the panoptic inpainting system 102 also receives user interaction erasing or removing one or more panoptic labels corresponding to one or more removed boundaries. In other cases, the panoptic inpainting system 102 automatically (e.g., without additional user interaction specifically prompting) removes panoptic labels corresponding to removed boundaries.

Additionally, the panoptic inpainting system 102 provides an edge mover 724. In particular, the panoptic inpainting system 102 receives user interaction selecting the edge mover 724 to move or relocate a boundary within the panoptic segmentation map 716. Additionally, the panoptic inpainting system 102 receives user interaction applying the edge mover 724 to one or more edges or boundaries within the panoptic segmentation map 716. The panoptic inpainting system 102 can further modify the panoptic segmentation map 716 to expand or reduce panoptic regions according to the movement of a boundary (e.g., to increase an area associated with a particular panoptic label).

As further shown, the panoptic inpainting system 102 provides a map creation element 726 selectable to generate or create a new panoptic segmentation map. In particular, the panoptic inpainting system 102 receives an indication of user interaction with the map creation element 726. In response, the panoptic inpainting system 102 provides a panoptic map design window to facilitate user interaction to create a custom panoptic segmentation map (e.g., utilizing one or more tools, such as the panoptic segment brushes 718, the edge pencil 720, the edge eraser 722, and/or the edge mover 724). The panoptic inpainting interface 714 further includes a panoptic inpainting element 728 selectable to generate an inpainted digital image as guided by the modified panoptic segmentation map 716 (e.g., based on edits or modifications to panoptic segments using one or more of the illustrated tools) and/or a binary map defined via the client device 108.

Figure 7D:
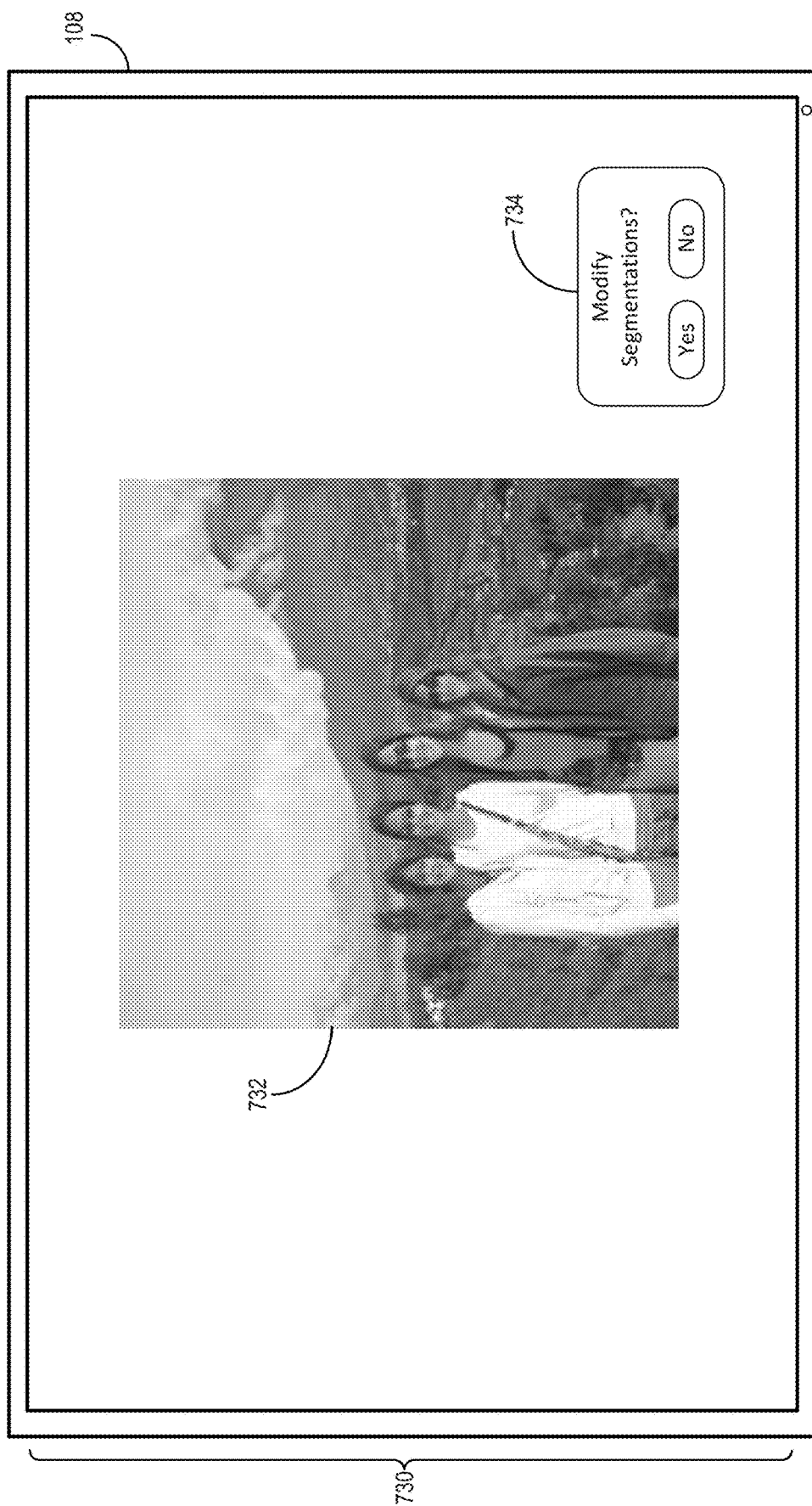

As just suggested, based on user interaction with the panoptic inpainting element 728, the panoptic inpainting system 102 generates an inpainted digital image. For example, as illustrated in FIG. 7D, the panoptic inpainting system 102 generates and provides a panoptic inpainting interface 730 including or depicting the inpainted digital image 732. As shown, the inpainted digital image 732 includes replacement pixels inpainted within the designated area according to the panoptic segmentation map 716, where the sky pixels are slightly expanded compared to match the modification reflect by the modified panoptic segmentation map 716. In addition, the panoptic inpainting system 102 generates and provides a segment modification element 734 selectable to modify the panoptic segmentation map 716. For instance, based on a selection of the segment modification element 734, the panoptic inpainting system 102 returns to the panoptic inpainting interface 714 of FIG. 7C for editing the panoptic segmentation map 716 and updating the inpainted digital image 732.

Figure 8:
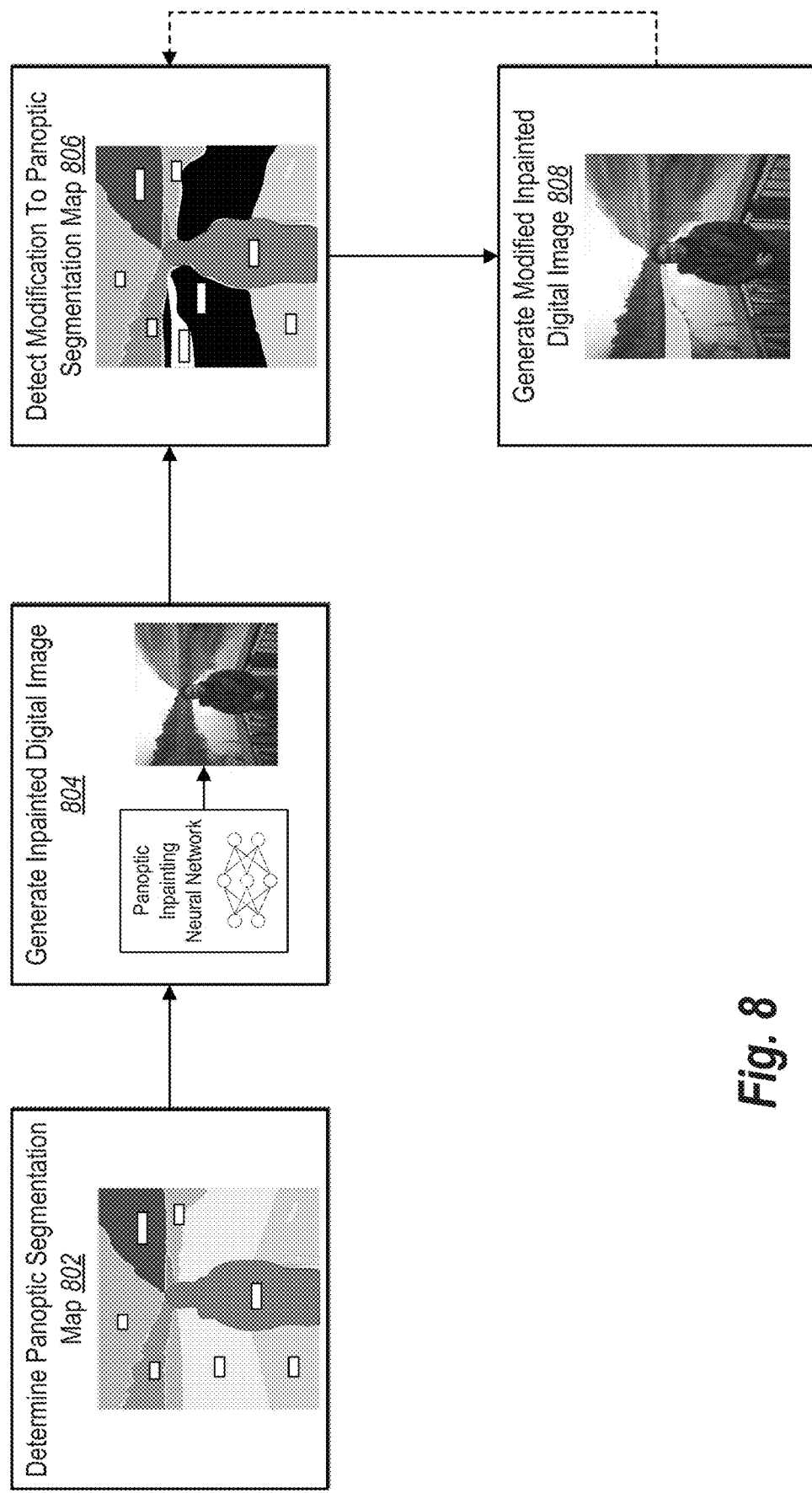
FIG. 8 illustrates an example sequence of acts for iteratively modifying an inpainted digital image in accordance with one or more embodiments.

As mentioned, in certain described embodiments, the panoptic inpainting system 102 iteratively updates an inpainted digital image. In particular, the panoptic inpainting system 102 iteratively updates an inpainted digital image based on modifications to a panoptic segmentation map (and/or a binary map) corresponding to the inpainted digital image. FIG. 8 illustrates an example flow diagram for iteratively updating an inpainted digital image in accordance with one or more embodiments.

As illustrated in FIG. 8, the panoptic inpainting system 102 performs an act 802 to determine a panoptic segmentation map. In particular, the panoptic inpainting system 102 determines or generates a panoptic segmentation map utilizing a segmentation neural network and/or via user interaction with a client device, as described above. For instance, the panoptic inpainting system 102 generates a panoptic segmentation map utilizing a segmentation neural network to predict boundaries for pixel regions and corresponding panoptic labels of a digital image.

As further illustrated in FIG. 8, the panoptic inpainting system 102 performs an act 804 to generate an inpainted digital image. More specifically, the panoptic inpainting system 102 utilizes a panoptic inpainting neural network to generate an inpainted digital image based on the panoptic segmentation map determined via the act 802. For instance, as described herein, the panoptic inpainting system 102 generates an inpainted digital image by inpainting a designated area of a digital image with replacement pixels determined by a panoptic inpainting neural network as guided by the panoptic segmentation map.

Additionally, the panoptic inpainting system 102 performs an act 806 to detect a modification to the panoptic segmentation map. To elaborate, the panoptic inpainting system 102 receives an indication of user interaction editing or modifying boundaries and/or labels associated with a panoptic segmentation map (e.g., as described above in relation to FIGS. 7A-7D). For example, as mentioned above, the panoptic inpainting system 102 receives user interaction to add a new region to a panoptic segmentation map, whereupon the panoptic inpainting system 102 updates the corresponding inpainted digital image by inpainting pixels for the new region.

Indeed, as shown, the panoptic inpainting system 102 performs an act 808 to generate a modified inpainted digital image in response to detecting the modification to the panoptic segmentation map (or in response to detecting a selection of an inpainting element after a modification to a panoptic segmentation map). To generate the modified inpainted digital image, the panoptic inpainting system 102 utilizes the panoptic inpainting neural network guided by the modified panoptic segmentation map. Indeed, as shown, the panoptic inpainting system 102 generates the modified inpainted digital image to reflect pixel changes corresponding to panoptic changes to the panoptic segmentation map.

In some embodiments, the panoptic inpainting system 102 repeats the acts 806 and 808 over multiple iterations. For example, the panoptic inpainting system 102 receives multiple updates over time to a panoptic segmentation map and subsequently generates a modified inpainted digital image to reflect each of the updates to the map. In some cases, the panoptic inpainting system 102 automatically updates the inpainted digital image with each change to the map in a real-time, on the fly fashion as the input is provided. In other cases, the panoptic inpainting system 102 update the inpainted digital image only upon detecting selection of an inpainting element to apply the changes made to the map.

Figure 9:
FIG. 9 illustrates example inpainted digital images comparing the panoptic inpainting system with prior systems in accordance with one or more embodiments.

As mentioned above, in certain embodiments, the panoptic inpainting system 102 improves accuracy over prior digital image systems. Indeed, experimenters have demonstrated the accuracy of the panoptic inpainting system 102 compared to other systems. In particular, the panoptic inpainting system 102 utilizes a panoptic inpainting neural network that affords improved inpainting accuracy for more realistic, semantically coherent generated digital images. FIG. 9 illustrates an example comparison of digital images generated by the panoptic inpainting system 102 to those generated by prior digital image systems in accordance with one or more embodiments.

As illustrated in FIG. 9, the table 900 includes two rows, each corresponding to a different example digital image to inpaint. For each of the two rows, the table 900 includes several columns. For example, the "Input" column indicates an input digital image to be inpainted. As shown, each of the input digital images depicts holes or designated areas of pixels to be replaced. The rightmost column, "Ground Truth," indicates a ground truth version of the input digital image before any pixels were removed in the designated areas. Each of the models of the remaining columns between "Input" and "Ground Truth" generate inpainted digital images in attempts to replicate the ground truth version as closely as possible.

As shown, the LaMa network (as described by Roman Suvorov et al.) inpaints digital image with blurred effects for the designated areas, struggling to achieve pixel clarity and definition for different regions. In addition, the CoModGAN model (as described by Shengyu Zhao et al.) generates nonsensical pixels to fill the designated areas of the input images, resulting in inpainted images that are jarring and unrealistic. Similarly, the CM-GAN model generates unrealistic replacement pixels, inserting image artifacts in various locations and struggling to maintain semantic coherence. Of the group within the table 900, the panoptic inpainting system 102 generates the most realistic, semantically coherent inpainted digital images, resembling the ground truth images most closely.

Figure 10:
FIG. 10 illustrates example inpainted digital images comparing the panoptic inpainting system with prior systems in accordance with one or more embodiments.

In one or more embodiments, the panoptic inpainting system 102 generates inpainted digital images using a portion of a panoptic segmentation map. More specifically, in some cases, rather than requiring both the semantic labels and the edge map of a panoptic segmentation map, the panoptic inpainting system 102 utilizes either the semantic labels or the edge map (but not necessarily both) to guide a panoptic inpainting neural network to inpaint a digital image. FIG. 10 illustrates example results and comparisons of image inpainting using semantic labels for the panoptic inpainting system 102 and other systems in accordance with one or more embodiments.

As illustrated in FIG. 10, the table 1000 includes three rows, each for a different digital image. Within each row, there is an "Input" column that indicates input digital images depicting holes or designated areas of pixels to be replaced. The table 1000 also includes a "Ground Truth" column reflecting ground truth images with actual pixels in areas that were removed to generate the input digital images. The table 1000 also includes a "Semantic Label" column indicating semantic labels for guiding the inpainting process.

Based on the semantic labels, experimenters generated inpainted images using the SESAME model guided by the respective semantic labels. Specifically, the SESAME model is described by Evangelos Ntavelis, Andrés Romero, Iason Kastanis, Luc Van Gool, and Radu Timofte in Sesame: *Semantic Editing of Scenes by Adding, Manipulating, or Erasing Objects*, European Conf. on Computer Vision, 394-411 (2020). In addition, the panoptic inpainting system 102 generated inpainted digital images from the respective semantic labels as well. Indeed, rather than separating instances of labels for panoptic segmentation, the panoptic inpainting system 102 generates inpainted digital images according to semantic labels that overlap label instances. As shown, even using semantic labels, the inpainted digital images of the panoptic inpainting system 102 are more realistic and semantically coherent than the images generated by the SESAME model.

Figure 11:
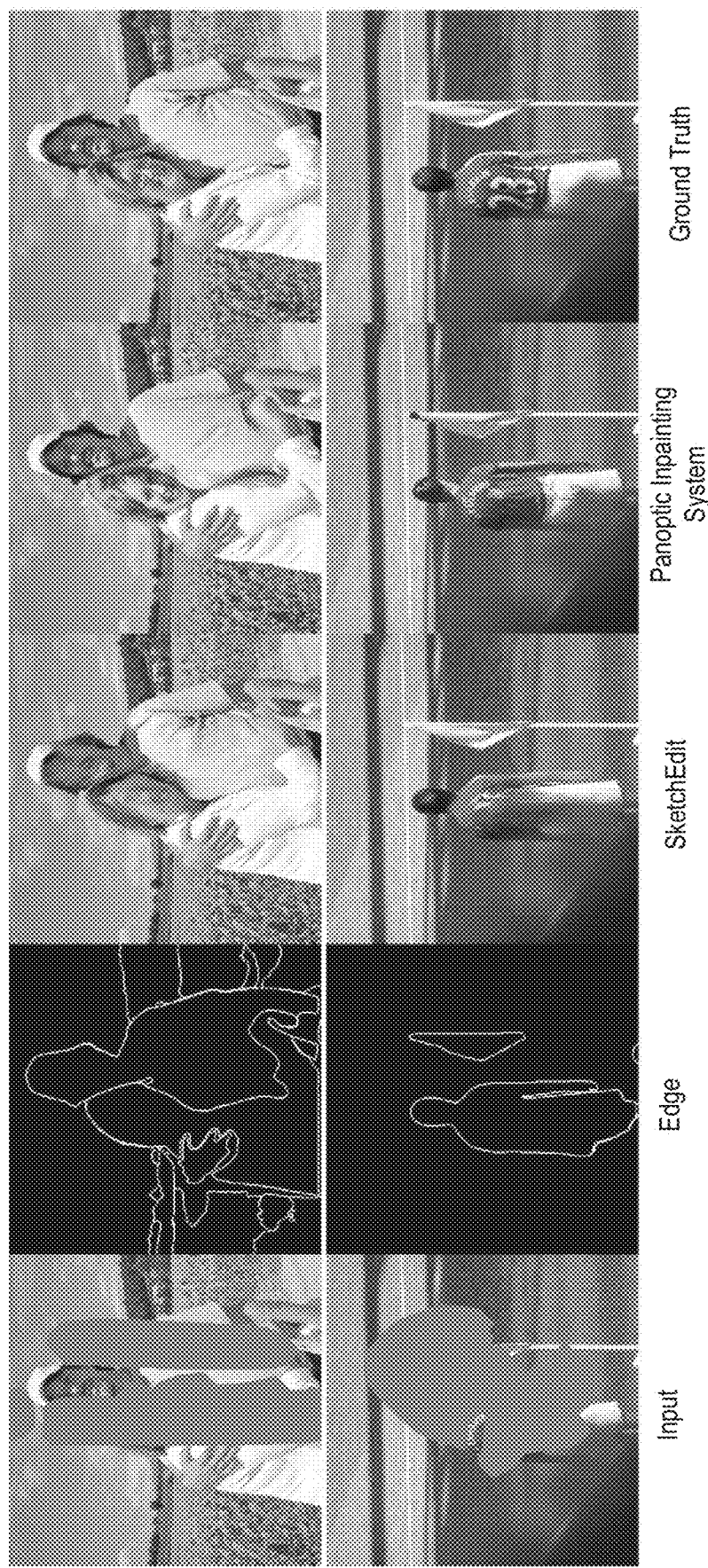
FIG. 11 illustrates example inpainted digital images comparing the panoptic inpainting system with prior systems in accordance with one or more embodiments.

As mentioned, in some embodiments, the panoptic inpainting system 102 generates inpainted digital images as guided by an edge map. In particular, the panoptic inpainting system 102 utilizes an edge map (from a panoptic segmentation map) to guide a panoptic inpainting neural network for inpainting a digital image. FIG. 11 illustrates example results and comparisons of image inpainting using edge maps for the panoptic inpainting system 102 and other systems in accordance with one or more embodiments.

As illustrated in FIG. 11, the table 1100 includes two rows, each for a different digital image. As also shown, the table 1100 also includes various columns, including an "Input" column that indicates input digital images depicting holes or designates areas of pixels to be replaced. In addition, the table 1100 includes a "Ground Truth" column that includes ground truth images corresponding to the input images with the actual pixels before they were removed. The table 1100 further includes an "Edge" column indicating edge maps used to guide the inpainting process.

As shown, the experimenters utilized a SketchEdit model and the panoptic inpainting system 102 to generate inpainted digital images, each guided by the edge maps. The SketchEdit model is described by Yu Zeng, Zhe Lin, and Vishal M. Patel in *SketchEdit: Mask-Free Local Image Manipulation with Partial Sketches*, arXiv:2111.15078 (2021). Comparing the results, even using the edge maps, the panoptic inpainting system 102 generates more realistic digital images than the SketchEdit model, with pixels more closely resembling those of the ground truth images.

To elaborate on the comparison of the panoptic inpainting system 102 with prior systems, experimenters have demonstrated the improvements of the panoptic inpainting techniques described herein. Indeed, experiments have tabulated results to empirically demonstrate accuracy improvements. FIG. 12 illustrates an example table of experimental results in accordance with one or more embodiments.

As illustrated in FIG. 12, the table 1200 depicts various experimental results for different models. For example, the table 1200 includes two main categories, one where the respective models generated inpainted digital images based on CoModGAN masks, and one where the respective models generated inpainted digital images based on Object masks. Within each category, the table 1200 includes various metrics, such as Frechet inception distance ("FID"), paired inception discriminative score ("P-IDS") and unpaired inception discriminative score ("U-IDS"). As indicated by the arrows in the table, lower FID scores indicate better accuracy, while higher P-IDS and U-IDS indicate better accuracy. As shown, the panoptic inpainting system 102 exhibits better accuracy based on all three metrics and for every tested scenario. Whether inpainting with panoptic segmentation, semantic segmentation, or edge maps, and whether doing so based on CoModGAN masks or objects masks, the panoptic inpainting system 102 outperforms the SESAME model, the LaMa model, the CoModGAN model, and the other depicted models as well.

Figure 13:
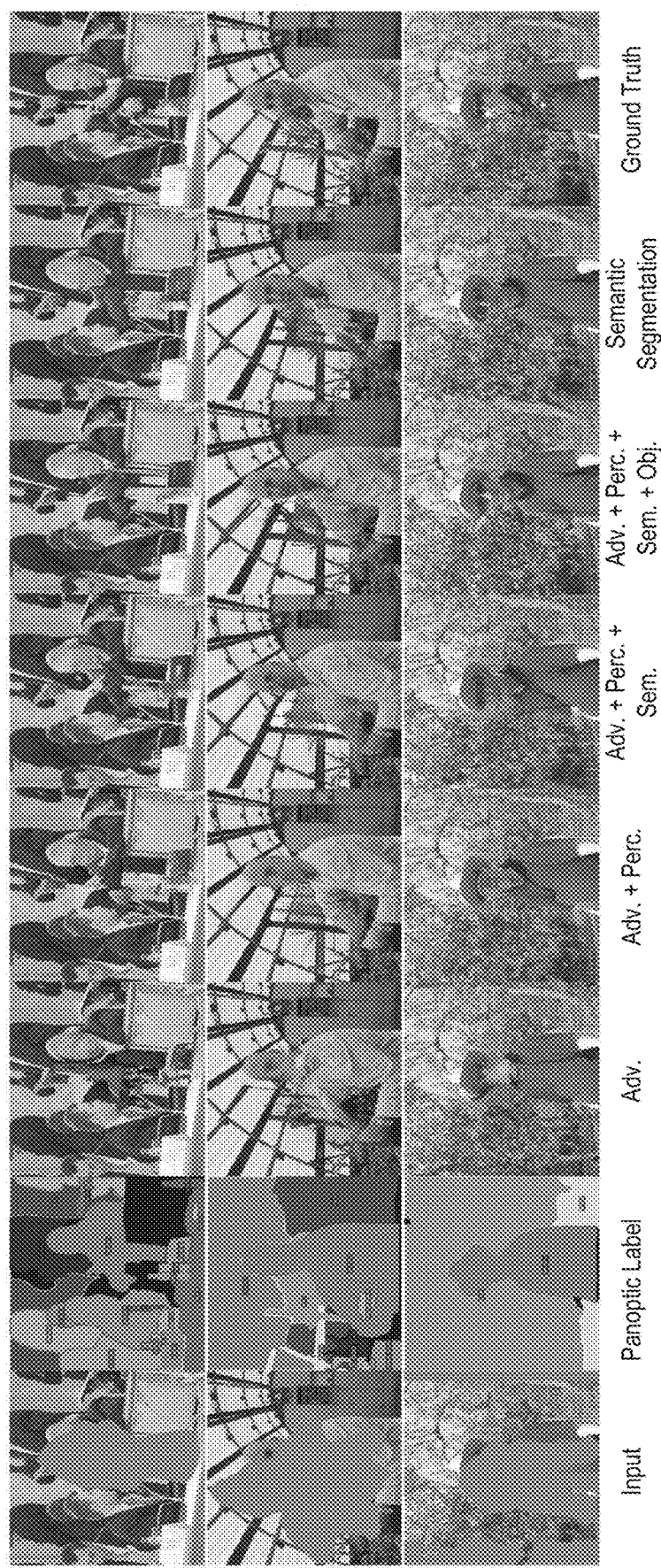
FIG. 13 illustrates example inpainted digital images for an ablation study of various aspects of the panoptic inpainting system in accordance with one or more embodiments.

In addition to demonstrating the accuracy improvement of the panoptic inpainting system 102 compared to prior models, experimenters also demonstrated the effects of various aspects of the panoptic inpainting system 102 using an ablation study. In particular, the experimenters demonstrated how certain losses and alterations to model architecture effect the results of image inpainting. FIG. 13 illustrates an example comparison of results using different aspects of the panoptic inpainting system 102 according to the ablation study in accordance with one or more embodiments. Thereafter, FIG. 14 illustrates an example table of ablation study results corresponding to the comparisons depicted in FIG. 13.

As illustrated in FIG. 13, experimenters trained a number of models, including and excluding various aspects or components of the overall panoptic inpainting system 102. For example, in one experiment, the experimenters trained a panoptic inpainting neural network using only adversarial loss (e.g., without perceptual/reconstructive loss) without using semantic discriminators. As another example, the experiments trained a panoptic inpainting neural network with both adversarial loss and perceptual/reconstructive loss without using semantic discriminators. In a third example, the experimenters trained a panoptic inpainting neural network using both losses and a semantic discriminator (e.g., only on the image level, but not on the object level). In a fourth example, the experimenters trained a full panoptic inpainting neural network with all of the losses and semantic discriminators at the object level and the image level. In a fifth example, the experimenters trained a panoptic inpainting neural network on semantic segmentation (but not panoptic). The table 1300 illustrates the results of each of these experiments for different images within the respective columns.

As illustrated in FIG. 14, the table 1400 includes numerical results of the experiments illustrated above in relation to FIG. 13. As shown in the table, the various versions of the panoptic inpainting neural network exhibit varying performance metrics, where the full panoptic inpainting neural network with adversarial loss, perceptual loss, and semantic discriminators at both the image level and the object level exhibits the most accurate performance. Indeed, the fully trained panoptic inpainting neural network exhibits the lowest FID score, the highest U-IDS score, and the highest P-IDS score.

Figure 15:
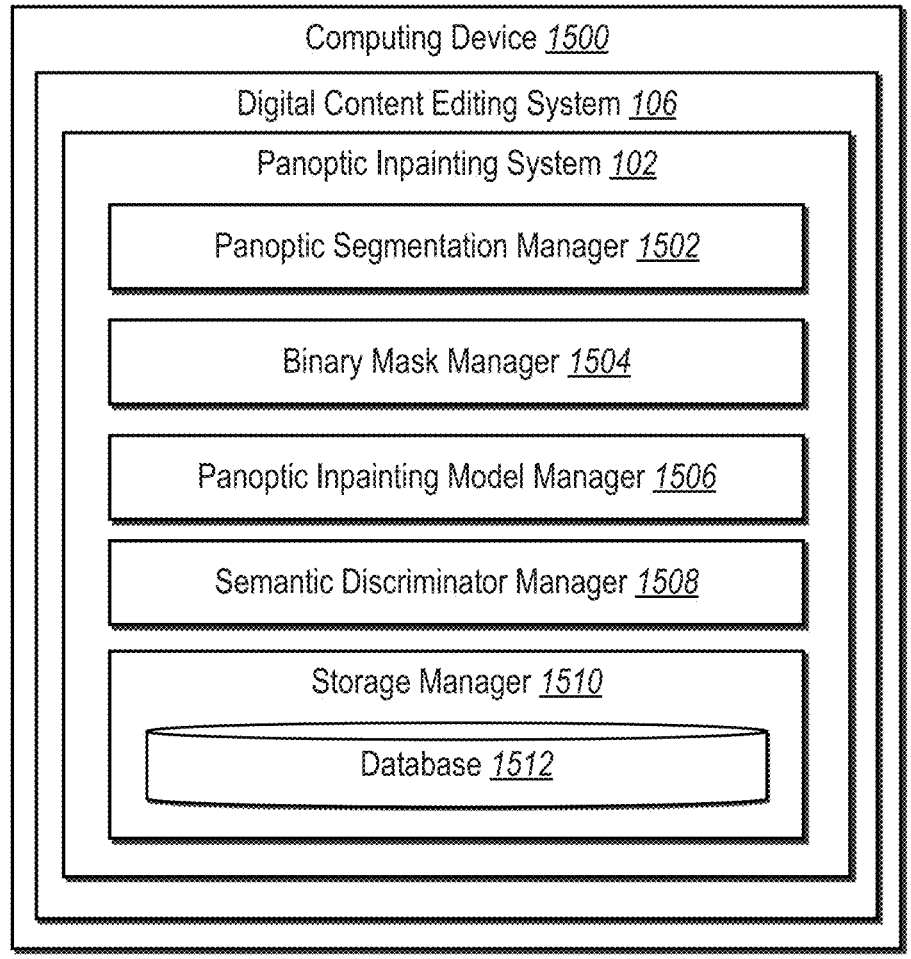
FIG. 15 illustrates a schematic diagram of a panoptic inpainting system in accordance with one or more embodiments.

Looking now to FIG. 15, additional detail will be provided regarding components and capabilities of the panoptic inpainting system 102. Specifically, FIG. 15 illustrates an example schematic diagram of the panoptic inpainting system 102 on an example computing device 1500 (e.g., one or more of the client device 108 and/or the server(s) 104). As shown in FIG. 15, the panoptic inpainting system 102 includes a panoptic segmentation manager 1502, a binary mask manager 1504, a panoptic inpainting model manager 1506, a semantic discriminator manager 1508, and a storage manager 1510.

As just mentioned, the panoptic inpainting system 102 includes a panoptic segmentation manager 1502. In particular, the panoptic segmentation manager 1502 manages, maintains, determines, generates, receives, or identifies a panoptic segmentation map for a digital image. For example, the panoptic segmentation manager 1502 determines edges and labels for various pixel regions of a digital image. In some cases, the panoptic segmentation manager 1502 generates the panoptic segmentation map based on user interaction via a client device. In other cases, the panoptic segmentation manager 1502 generate the panoptic segmentation map utilizing a segmentation neural network, as described above.

As shown, the panoptic inpainting system 102 further includes a binary mask manager 1504. In particular, the binary mask manager 1504 manages, maintains, generates, determines, receives, or identifies a binary mask associated with a digital image. For example, the binary mask manager 1504 determines a binary mask defining a designated area of pixels to be replaced within a digital image. In some cases, the binary mask manager 1504 determines a binary mask from user interaction via a client device. In other cases, the binary mask manager 1504 determines a binary mask utilizing a mask generator neural network, as described above.

Additionally, the panoptic inpainting system 102 includes a panoptic inpainting model manager 1506. In particular, the panoptic inpainting model manager 1506 manages, maintains, determines, generates, trains, tunes, applies, implements, utilizes, or learns parameters for a panoptic inpainting model, such as a panoptic inpainting neural network. As described herein, the panoptic inpainting model manager 1506 trains a panoptic inpainting neural network and applies the panoptic inpainting neural network to generate an inpainted digital image based on a panoptic segmentation map.

As further illustrated in FIG. 15, the panoptic inpainting system 102 includes a semantic discriminator manager 1508. In particular, the semantic discriminator manager 1508 operates in conjunction with the panoptic inpainting model manager 1506 to train a panoptic inpainting neural network. For example, the semantic discriminator manager 1508 manages or utilizes one or more semantic discriminators to learn parameters for a panoptic inpainting neural network. As described, the semantic discriminator manager 1508 utilizes an image-level semantic discriminator and an object-level semantic discriminator to generate realism predictions for generated digital images as part of a training process.

The panoptic inpainting system 102 further includes a storage manager 1510. The storage manager 1510 operates in conjunction with the other components of the panoptic inpainting system 102 and includes one or more memory devices such as the database 1512 (e.g., the database 112) that stores various data such as digital images, neural networks, inpainted digital images, and panoptic segmentation maps.

In one or more embodiments, each of the components of the panoptic inpainting system 102 are in communication with one another using any suitable communication technologies. Additionally, the components of the panoptic inpainting system 102 are in communication with one or more other devices including one or more client devices described above. It will be recognized that although the components of the panoptic inpainting system 102 are shown to be separate in FIG. 15, any of the subcomponents may be combined into fewer components, such as into a single component, or divided into more components as may serve a particular implementation. Furthermore, although the components of FIG. 15 are described in connection with the panoptic inpainting system 102, at least some of the components for performing operations in conjunction with the panoptic inpainting system 102 described herein may be implemented on other devices within the environment.

The components of the panoptic inpainting system 102 include software, hardware, or both. For example, the components of the panoptic inpainting system 102 include one or more instructions stored on a computer-readable storage medium and executable by processors of one or more computing devices (e.g., the computing device 1500). When executed by the one or more processors, the computer-executable instructions of the panoptic inpainting system 102 cause the computing device 1500 to perform the methods described herein. Alternatively, the components of the panoptic inpainting system 102 comprise hardware, such as a special purpose processing device to perform a certain function or group of functions. Additionally, or alternatively, the components of the panoptic inpainting system 102 include a combination of computer-executable instructions and hardware.

Furthermore, the components of the panoptic inpainting system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the panoptic inpainting system 102 may be implemented as part of a stand-alone application on a personal computing device or a mobile device. Alternatively, or additionally, the components of the panoptic inpainting system 102 may be implemented in any application that allows creation and delivery of content to users, including, but not limited to, applications in ADOBE® EXPERIENCE MANAGER and CREATIVE CLOUD®, such as PHOTOSHOP®, LIGHTROOM®, and INDESIGN®. "ADOBE," "ADOBE EXPERIENCE MANAGER," "CREATIVE CLOUD," "PHOTOSHOP," "LIGHTROOM," and "INDESIGN" are either registered trademarks or trademarks of Adobe Inc. in the United States and/or other countries.

FIGS. 1-15 the corresponding text, and the examples provide a number of different systems, methods, and non-transitory computer readable media for generating inpainting digital images utilizing a panoptic inpainting neural network, as well as training the panoptic inpainting neural network, providing a panoptic inpainting interface, and iteratively updating inpainted digital images. In addition to the foregoing, embodiments can also be described in terms of flowcharts comprising acts for accomplishing a particular result. For example, FIGS. 16-19 illustrate flowcharts of example sequences or series of acts in accordance with one or more embodiments.

While FIGS. 16-19 illustrate acts according to particular embodiments, alternative embodiments may omit, add to, reorder, and/or modify any of the acts shown in FIGS. 16-19. The acts of FIGS. 16-19 can be performed as part of a method. Alternatively, a non-transitory computer readable medium can comprise instructions, that when executed by one or more processors, cause a computing device to perform the acts of FIGS. 16-19. In still further embodiments, a system can perform the acts of FIGS. 16-19. Additionally, the acts described herein may be repeated or performed in parallel with one another or in parallel with different instances of the same or other similar acts.

FIG. 16 illustrates an example series of acts 1600 for training a neural network utilizing a semantic discriminator in accordance with one or more embodiments. In particular, the series of acts 1600 includes an act 1602 of generating a predicted digital image from a semantic segmentation. For example, the act 1602 can involve generating a predicted digital image from a semantic segmentation of a digital image utilizing a neural network. In some cases, the act 1602 involves generating a predicted digital image from a digital image and a semantic segmentation utilizing the neural network.

As shown, the series of acts 1600 also includes an act 1604 of utilizing a semantic discriminator. Indeed, the act 1604 can include one or more constituent acts, such as an act 1606 of generating a semantic image embedding from the predicted digital image and an act 1608 of generating a realism prediction from the semantic image embedding. For example, in some cases the act 1606 includes generating, utilizing a semantic discriminator, a semantic image embedding from the predicted digital image and the semantic segmentation. In some cases, the act 1608 includes generating a realism prediction, utilizing the semantic discriminator, from the semantic image embedding.

In one or more embodiments, the act 1608 involves generating an image embedding from the predicted digital image utilizing a first encoder of the semantic discriminator. In some cases, the act 1608 further involves generating the semantic image embedding from the predicted digital image and the semantic segmentation utilizing a second encoder of the semantic discriminator. In these or other cases, the act 1608 involves determining the realism prediction from a combination of the first image embedding and the semantic image embedding. In some embodiments, the act 1608 involves utilizing the semantic discriminator to determine realism of the predicted digital image together with conformity of the predicted digital image to the semantic segmentation. In these or other embodiments, the act 1608 involves utilizing the semantic discriminator as part of an image-level discriminator to determine a realism score for an entirety of the predicted digital image.

In certain cases, the act 1608 involves utilizing the semantic discriminator as part of an object-level discriminator to determine a realism score for a crop of the predicted digital image. In one or more implementations, the act 1608 involves utilizing the semantic discriminator to generate a first realism score and utilizing a generative adversarial discriminator to generate a second realism score. In these or other implementations, the act 1608 involves determining a bounding box for a crop of the predicted digital image and utilizing the object-level semantic discriminator to determine a realism score for the crop of the predicted digital image.

In one or more embodiments, the act 1608 involves identifying a binary mask indicating background pixels and foreground pixels for the crop of the predicted digital image. In addition, the act 1608 involves utilizing the object-level semantic discriminator to determine the realism score for the foreground pixels of the crop of the predicted digital image indicated by the binary mask. In some cases, the act 1608 involves determining, from the sample digital image data, a panoptic condition comprising a binary mask, a semantic embedding, and an edge map. Further, the act 1608 sometimes involves utilizing an image embedding model to extract an image embedding from the predicted digital image and determining the realism prediction from a combination of the image embedding and the panoptic condition.

In certain implementations, the act 1608 involves utilizing the semantic discriminator as part of an image-level discriminator to determine a realism score for an entirety of the predicted digital image. In addition, the act 1608 sometimes involves utilizing an additional semantic discriminator as part of an object-level discriminator to determine a realism score for a crop of the predicted digital image.

In some embodiments, determining the panoptic condition involves identifying the binary mask indicating pixels to replace within a sample digital image, generating the semantic embedding indicating semantic labels for objects depicted within the sample digital image, and determining the edge map defining boundaries between the objects depicted within the sample digital image. The act 1608 sometimes involves generating a crop of the predicted digital image, generating a cropped binary mask, a cropped semantic label map, and a cropped edge map associated with the sample digital image data, and utilizing the object-level semantic discriminator to generate the realism prediction from the crop of the predicted digital image, the cropped binary mask, the cropped semantic label map, and the cropped edge map.

Additionally, as illustrated in FIG. 16, the series of acts 1600 includes an act 1610 of modifying the parameters of a neural network based on the realism prediction. In particular, the act 1610 involves determining an adversarial loss utilizing the semantic discriminator. In some cases, the act 1610 involves determining a reconstruction loss by comparing the predicted digital image with the digital image. In these or other cases, the act 1610 involves modifying the parameters of the neural network based on the adversarial loss and the reconstruction loss. In certain embodiments, the act 1610 involves determining an overall adversarial loss by combining a first adversarial loss associated with the image-level semantic discriminator and a second adversarial loss associated with the object-level semantic discriminator and modifying the parameters based on the overall adversarial loss.

In some embodiments, the series of acts 1600 includes an act of generating, utilizing a first encoder of a semantic discriminator, an image embedding from the predicted digital image. Determining the realism prediction sometimes includes determining the realism prediction from the image embedding and the semantic image embedding utilizing the semantic discriminator. In some cases, the series of acts 1600 includes an act of determining, from the sample digital image data, a panoptic condition comprising a binary mask indicating pixels to replace within a sample digital image, a semantic embedding representing semantic labels for objects within the sample digital image, and an edge map reflecting boundaries between the objects within the sample digital image. Determining the realism prediction sometimes includes utilizing the semantic discriminator to generate a realism score for the predicted digital image based on the panoptic condition.

In certain cases, the series of acts 1600 includes an act of determining an overall adversarial loss by combining a first adversarial loss associated with an image-level semantic discriminator, a second adversarial loss associated with an object-level semantic discriminator, a third adversarial loss associated with an image-level generative adversarial discriminator, and a fourth adversarial loss associated with an object-level generative adversarial discriminator. Modifying the parameters of the neural network sometimes includes modifying the parameters to reduce the overall adversarial loss.

Figure 17:
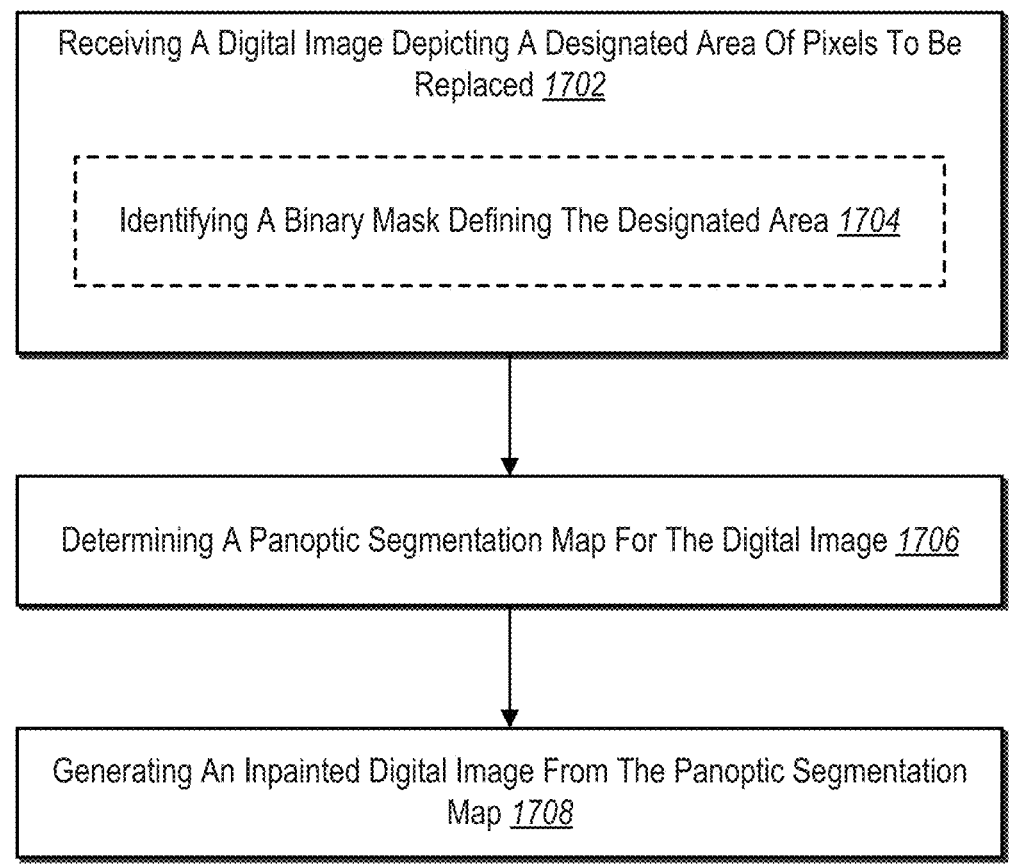
FIG. 17 illustrates a flowchart of a series of acts for generating an inpainted digital image utilizing a panoptic inpainting neural network in accordance with one or more embodiments.

FIG. 17 illustrates an example series of acts 1700 for generating an inpainted digital image utilizing a panoptic inpainting neural network in accordance with one or more embodiments. The series of acts 1700 includes an act 1702 of receiving a digital image depicting a designated area of pixels to be replaced. In some cases, the act 1702 includes an additional act 1704 of identifying a binary mask defining the designated area. For example, the act 1704 involves identifying a binary mask defining a designated area within the digital image for the pixels to be replaced. In some cases, the act 1704 involves utilizing a mask generator neural network to determine the designated area from the digital image.

As shown, the series of acts 1700 includes an act 1706 of determining a panoptic segmentation map for the digital image. In particular, the act 1706 involves determining, for the digital image, a panoptic segmentation map comprising panoptic labels for regions of the digital image. For example, the act 1706 involves determining different panoptic labels for regions of the digital image sharing a common semantic label. In some cases, the act 1706 involves utilizing a segmentation neural network to generate the panoptic labels for the regions of the digital image. In certain embodiments, the act 1706 involves determining boundaries between regions of the digital image corresponding to different semantic labels and determining boundaries between regions of the digital image corresponding to different instances of shared semantic labels.

In some embodiments, the act 1706 involves generating an intermediate digital image from the digital image utilizing an image generator neural network. In addition, the act 1706 involves utilizing a panoptic segmentation neural network to generate the panoptic labels for the panoptic segmentation map from the intermediate digital image. In some cases, the act 1706 involves receiving an indication of user interaction from a client device defining the panoptic labels for the regions of the digital image.

As further illustrated in FIG. 17, the series of acts 1700 includes an act 1708 of generating an inpainted digital image from the panoptic segmentation map. In particular, the act 1708 involves generating from the digital image and the panoptic segmentation map, utilizing a panoptic inpainting neural network, an inpainted digital image depicting replacement pixels for the designated area of pixels within the digital image. For example, the act 1708 involves utilizing the panoptic inpainting neural network to inpaint a first portion of the designated area of the digital image with pixels that correspond to a first panoptic label. The act 1708 further involves utilizing the panoptic inpainting neural network to inpaint a second portion of the designated area of the digital image with pixels that correspond to a second panoptic label. In some cases, the act 1708 involves utilizing the panoptic inpainting neural network to inpaint the designated area of the digital image by filling missing pixels of the designated area.

In some embodiments, the series of acts 1700 includes an act of identifying a binary mask defining the designated area within the digital image for the pixels to be replaced. In these other embodiments, generating an inpainted digital image involves utilizing the panoptic inpainting neural network to inpaint the designated area of the digital image with the replacement pixels according to the panoptic segmentation map and the binary mask. In some cases, the act 1708 involves generating from the digital image, the panoptic segmentation map, and the binary mask, utilizing the panoptic inpainting neural network, the inpainted digital image depicting replacement pixels for the designated area of pixels within the digital image.

In one or more implementations, the act 1708 involves utilizing the panoptic inpainting neural network to inpaint the designated area of the digital image by filling the designated area with pixels corresponding to panoptic labels of objects depicted within the digital image. In certain cases, the act 1708 involves receiving an indication of user interaction from a client device modifying the panoptic segmentation map. For instance, the act 1708 involves utilizing the panoptic inpainting neural network to inpaint the designated area of the digital image according to the panoptic segmentation map modified via the client device. In certain cases, the act 1708 involves utilizing the panoptic inpainting neural network to inpaint the designated area of the digital image by filling the designated area with pixels corresponding to a panoptic label of an object not depicted within the digital image.

In some embodiments, the series of act 1700 includes an act of receiving an indication of user interaction from a client device to modify the panoptic segmentation map to include the panoptic label of the object not depicted within the digital image.

Figure 18:
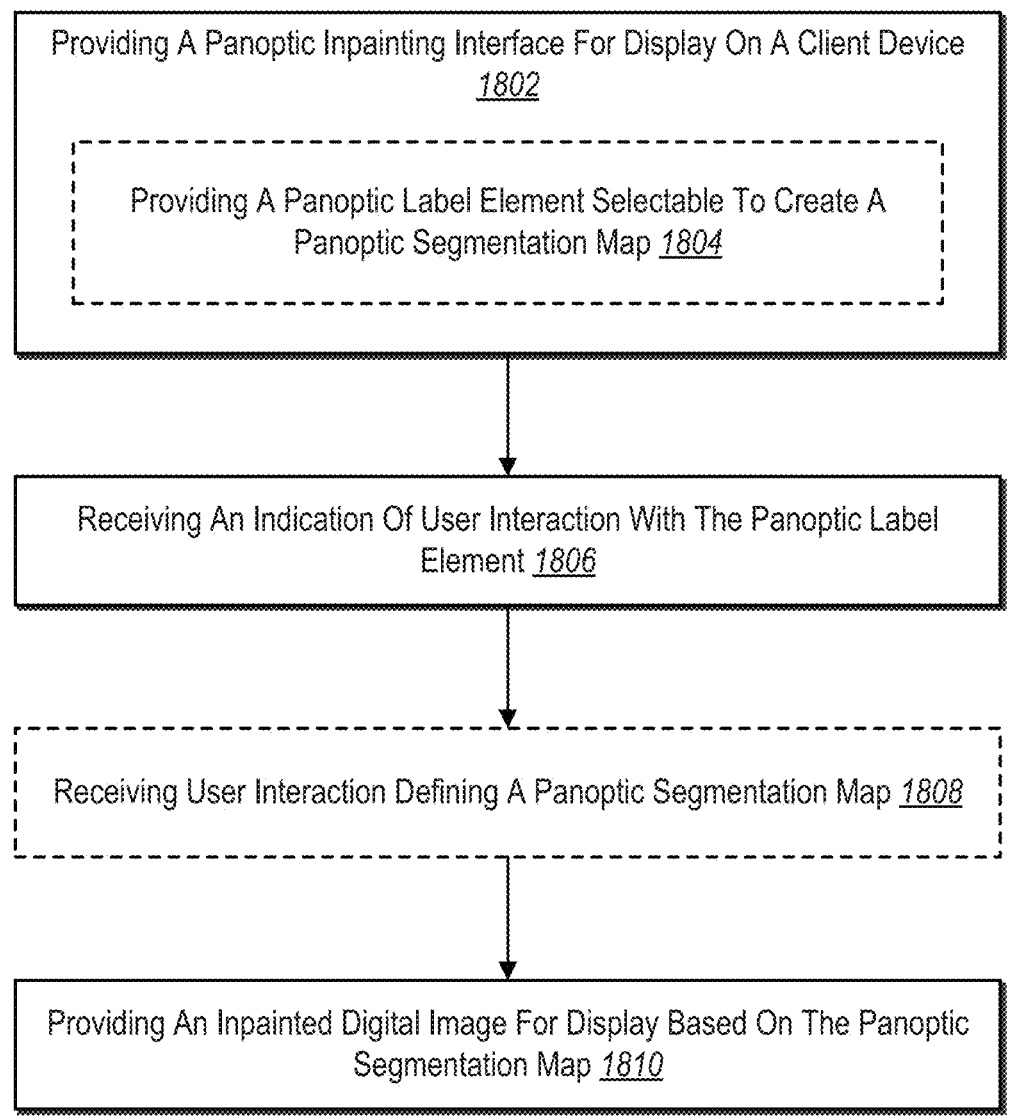
FIG. 18 illustrates a flowchart of a series of acts for providing a panoptic inpainting interface for generating and modifying inpainted digital images in accordance with one or more embodiments.

FIG. 18 illustrates an example series of acts 1800 for providing a panoptic inpainting interface for generating and modifying inpainted digital images utilizing panoptic guides in accordance with one or more embodiments. In particular, the series of acts 1800 includes an act 1802 of providing a panoptic inpainting interface for display on a client device. In some cases, the act 1802 includes an additional act 1804 of providing a panoptic label element selectable to create a panoptic segmentation map. For example, the act 1804 includes providing a panoptic label element selectable to create a panoptic segmentation map for inpainting a digital image. In some cases, the act 1802 includes providing, for display together with the panoptic label element, an inpainting element selectable to generate the inpainted digital image utilizing the panoptic inpainting neural network. In some cases, the act 1802 includes providing, for display within the panoptic inpainting interface, a panoptic boundary drawing tool selectable to define panoptic regions of the digital image.

In addition, the series of acts 1800 includes an act 1806 of receiving an indication of user interaction with the panoptic label element. In particular, the act 1806 involves receiving, from the client device, an indication of user interaction with the panoptic label element to define the panoptic segmentation map within the panoptic inpainting interface. For example, the act 1806 involves receiving panoptic labels for regions of the digital image. As another example, the act 1806 involves receiving indications of boundaries for regions of the digital image. Receiving the boundaries sometimes includes receiving inputs to define the regions with different colors corresponding to respective panoptic labels and delineating the regions of the digital image.

As further shown, in some embodiments, the series of acts 1800 includes an act 1808 of receiving user interaction defining a panoptic segmentation map. In particular, the act 1808 involves receiving panoptic segmentation boundaries defining regions of the digital image within the panoptic inpainting interface. In addition, the act 1808 involves receiving panoptic labels entered via the panoptic inpainting interface for the regions of the digital image. In some cases, the act 1808 involves receiving input strokes using the panoptic boundary drawing tool to define regions of the digital image. Receiving the input strokes sometimes includes receiving input strokes defining regions for panoptic labels associated with objects depicted within the digital image. In some cases, receiving the input strokes includes defining regions for a panoptic label associated with an object not depicted within the digital image.

Further, the series of acts 1810 includes an act 1810 of providing an inpainted digital image for display based on the panoptic segmentation map. In particular, the act 1810 involves providing, for display within the panoptic inpainting interface, an inpainted digital image generated utilizing a panoptic inpainting neural network based on receiving the indication of the user interaction to define the panoptic segmentation map. For example, the act 1810 involves providing, for display within the panoptic inpainting interface based on receiving the indication of the user interaction to define the panoptic segmentation map, an inpainted digital image generated utilizing a panoptic inpainting neural network trained using a semantic discriminator for generating realistic digital images that conform to panoptic boundaries.

In some embodiments, the series of acts 1800 includes an act of providing, for display within the panoptic inpainting interface in response to the indication of the user interaction with the panoptic label element, a panoptic segmentation map design window modifiable to define the panoptic segmentation map for the digital image. In some cases, the series of acts 1800 includes an act of receiving, from the client device, an additional indication of user interaction with an image mask element to define a binary mask for pixels of the digital image to replace.

Additionally, the series of act 1800 includes an act of generating the inpainted digital image utilizing the panoptic inpainting neural network to replace the pixels of the digital image indicated by the binary mask according to the panoptic segmentation mask. Thus, providing the inpainting digital image sometimes includes providing, for display within the panoptic inpainting interface, an inpainted digital image generated utilizing a panoptic inpainting neural network based on a first indication of user interaction with a panoptic label element and a second indication of user interaction with an image mask element. In some cases, receiving the second indication of user interaction to define binary mask includes receiving, via the panoptic inpainting interface, an indication of pixels of the digital image to designate as pixels to be replaced by the panoptic inpainting neural network.

In some cases, the series of acts 1800 includes an act of utilizing a segmentation neural network to determine different regions of the digital image. In these or other cases, the act 1808 includes receiving panoptic labels entered via the panoptic inpainting interface for the different regions of the digital image. In certain embodiments, the series of acts 1800 includes an act of utilizing the panoptic inpainting neural network to generate the inpainted digital image by replacing pixels within a designated area of the digital image according to the panoptic segmentation map. The series of acts 1800 sometimes includes an act of utilizing a segmentation neural network to determine panoptic labels for the regions of the digital image.

Figure 19:
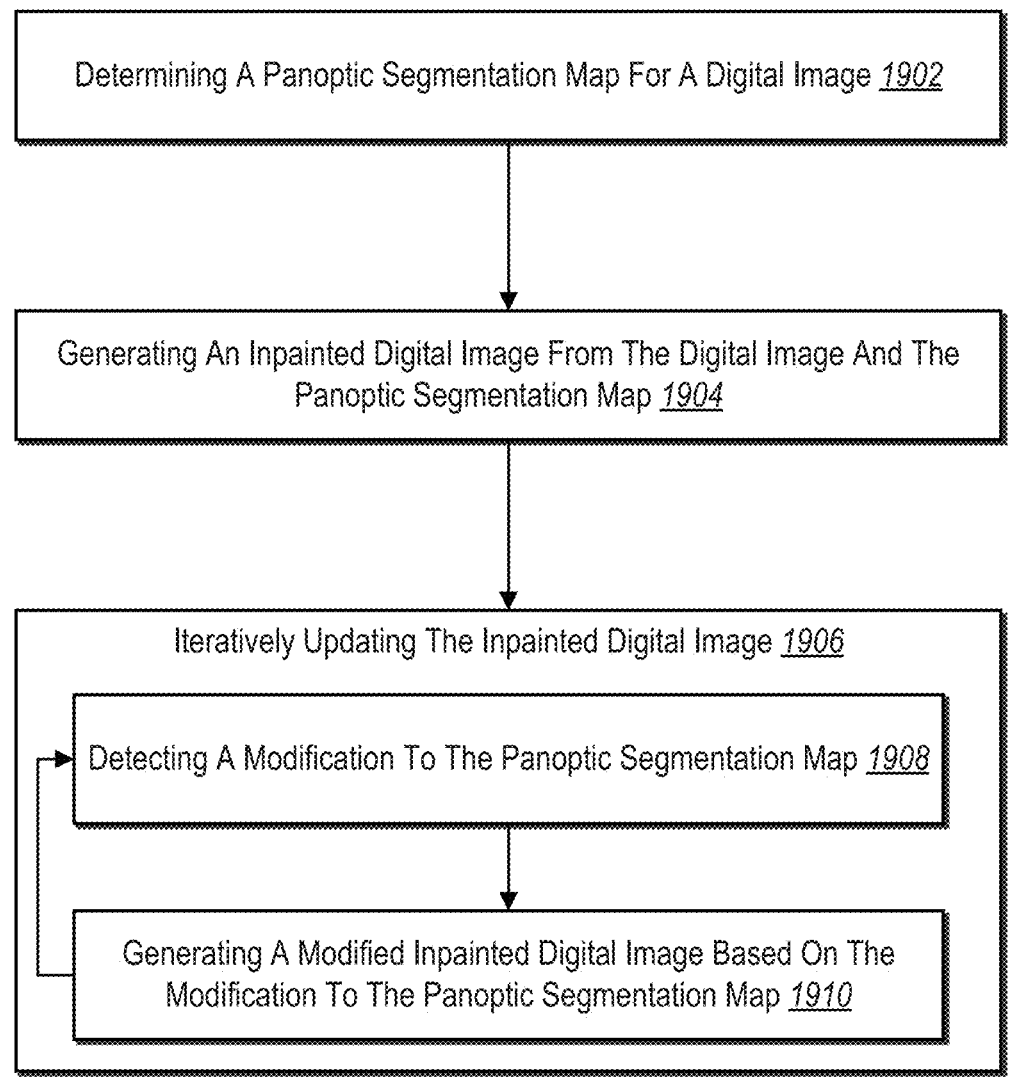
FIG. 19 illustrates a flowchart of a series of acts for iteratively modifying an inpainted digital image generated utilizing panoptic guidance in accordance with one or more embodiments.

FIG. 19 illustrates an example series of acts 1900 for iteratively updating an inpainted digital image utilizing panoptic guides in accordance with one or more embodiments. In particular, the series of acts 1900 includes an act 1902 of determining a panoptic segmentation map for a digital image. For example, the act 1902 involves determining a panoptic segmentation map defining panoptic labels for regions of a digital image. In some cases, the act 1902 involves utilizing a panoptic segmentation neural network to determine the regions of pixels depicted within the digital image and the panoptic labels corresponding to the regions.

As shown, the series of acts 1900 also includes an act 1904 of generating an inpainted digital image from the digital image and the panoptic segmentation map. In particular, the act 1904 involves generating an inpainted digital image from the digital image and the panoptic segmentation map utilizing a panoptic inpainting neural network. In some cases, the series of acts 1900 includes an act of determining a binary mask defining a designated area of pixels to be replaced within the digital image. In these or other cases, the act 1904 involves generating an inpainted digital image from the digital image, the panoptic segmentation map, and the binary mask utilizing a panoptic inpainting neural network.

As further illustrated in FIG. 19, the series of acts 1900 includes an act 1906 of iteratively updating the inpainted digital image. In particular, the act 1906 includes detecting a modification to the binary mask to define a new designated area of pixels to be replaced within the digital image and generating the modified inpainted digital image by inpainting the new designated area with replacement pixels utilizing the panoptic inpainting neural network according to the modification to the binary mask. In some embodiments, the act 1906 involves detecting a sequence of additional modifications to the panoptic segmentation map and iteratively updating the modified inpainted digital image utilizing the panoptic segmentation map for each of the sequence of additional modifications.

In some cases, the act 1906 includes additional acts, including the act 1908 of detecting a modification to the panoptic segmentation map and the act 1910 of generating a modified inpainted digital image based on the modification to the panoptic segmentation map. For example, the act 1910 includes generating a modified inpainted digital image utilizing the panoptic inpainting neural network according to the modification to the panoptic segmentation.

In certain embodiments, the act 1910 involves utilizing the panoptic inpainting neural network to inpaint a designated region of the digital image with replacement pixels. The series of acts 1900 sometimes includes an act of determining the designated region of the digital image according to a binary mask indicating the designated region. In one or more implementations, the act 1910 includes utilizing the panoptic inpainting neural network to inpaint a designated region of the digital image with replacement pixels corresponding to the new region and the new panoptic label. The act 1910 sometimes involves utilizing the panoptic inpainting neural network to inpaint a designated region of the digital image with replacement pixels corresponding to remaining regions within the panoptic segmentation map.

In some cases, the act 1908 involves receiving, from a client device, an indication of user interaction modifying a panoptic label associated with a region of the digital image. In these or other cases, the act 1908 involves receiving, from a client device, an indication of user interaction modifying a region of pixels depicted within the digital image. For instance, the act 1908 includes receiving, from a client device, an indication of user interaction adding a new region and a new panoptic label corresponding to the new region to the panoptic segmentation map. In some cases, the act 1908 involves receiving, from a client device, an indication of user interaction removing a region and a corresponding panoptic label from the panoptic segmentation map. The act 1908 sometimes includes receiving, from a client device, an indication of user interaction modifying a boundary associated with a region of the digital image.

In one or more embodiments, the series of acts 1900 includes an act of detecting an additional modification to the panoptic segmentation map. In these or other embodiments, the series of acts 1900 includes an act of updating the modified inpainted digital image utilizing the panoptic segmentation map based on the additional modification. The series of acts 1900 sometimes includes an act of determining a binary mask defining a designated area of pixels to be replaced within the digital image. In certain cases, the act 1910 involves utilizing the panoptic inpainting neural network to inpaint the designated area of the digital image with replacement pixels according to the panoptic segmentation map and the binary mask.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 20:
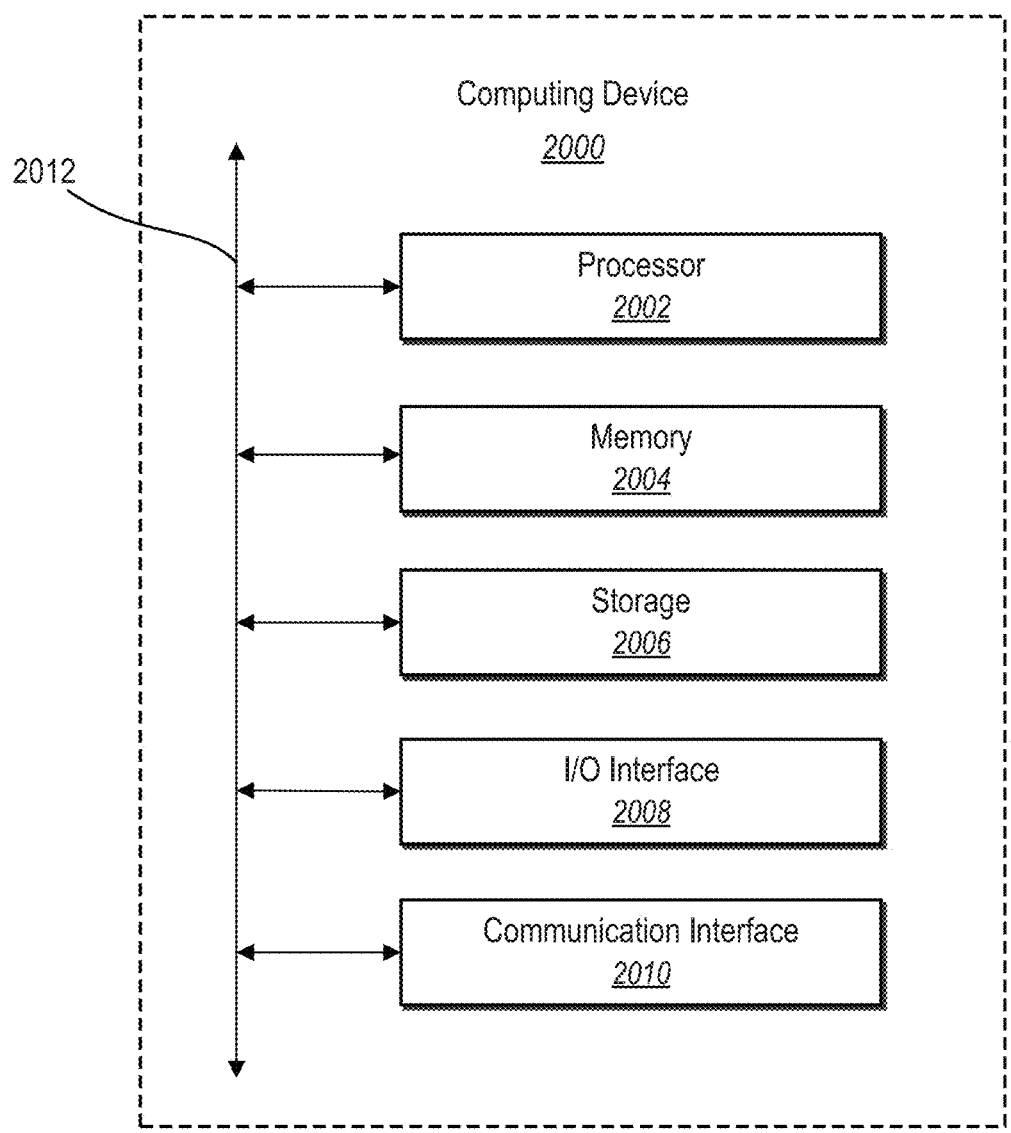
FIG. 20 illustrates a block diagram of an example computing device in accordance with one or more embodiments.

FIG. 20 illustrates, in block diagram form, an example computing device 2000 (e.g., the computing device 1500, the client device 108, and/or the server(s) 104) that may be configured to perform one or more of the processes described above. One will appreciate that the panoptic inpainting system 102 can comprise implementations of the computing device 2000. As shown by FIG. 20, the computing device can comprise a processor 2002, memory 2004, a storage device 2006, an I/O interface 2008, and a communication interface 2010. Furthermore, the computing device 2000 can include an input device such as a touchscreen, mouse, keyboard, etc. In certain embodiments, the computing device 2000 can include fewer or more components than those shown in FIG. 20. Components of computing device 2000 shown in FIG. 20 will now be described in additional detail.

In particular embodiments, processor(s) 2002 includes hardware for executing instructions, such as those making up a computer program. As an example, and not by way of limitation, to execute instructions, processor(s) 2002 may retrieve (or fetch) the instructions from an internal register, an internal cache, memory 2004, or a storage device 2006 and decode and execute them.

The computing device 2000 includes memory 2004, which is coupled to the processor(s) 2002. The memory 2004 may be used for storing data, metadata, and programs for execution by the processor(s). The memory 2004 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 2004 may be internal or distributed memory.

The computing device 2000 includes a storage device 2006 includes storage for storing data or instructions. As an example, and not by way of limitation, storage device 2006 can comprise a non-transitory storage medium described above. The storage device 2006 may include a hard disk drive (HDD), flash memory, a Universal Serial Bus (USB) drive or a combination of these or other storage devices.

The computing device 2000 also includes one or more input or output ("I/O") devices/interfaces 2008, which are provided to allow a user to provide input to (such as user strokes), receive output from, and otherwise transfer data to and from the computing device 2000. These I/O devices/interfaces 2008 may include a mouse, keypad or a keyboard, a touch screen, camera, optical scanner, network interface, modem, other known I/O devices or a combination of such I/O devices/interfaces 2008. The touch screen may be activated with a writing device or a finger.

The I/O devices/interfaces 2008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 2008 is configured to provide graphical data to a display for presentation to a user. The graphical data may be representative of one or more graphical user interfaces and/or any other graphical content as may serve a particular implementation.

The computing device 2000 can further include a communication interface 2010. The communication interface 2010 can include hardware, software, or both. The communication interface 2010 can provide one or more interfaces for communication (such as, for example, packet-based communication) between the computing device and one or more other computing devices 2000 or one or more networks. As an example, and not by way of limitation, communication interface 2010 may include a network interface controller (NIC) or network adapter for communicating with an Ethernet or other wire-based network or a wireless NIC (WNIC) or wireless adapter for communicating with a wireless network, such as a WI-FI. The computing device 2000 can further include a bus 2012. The bus 2012 can comprise hardware, software, or both that couples components of computing device 2000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium storing executable instructions which, when executed by a processing device, cause the processing device to perform operations comprising:
   providing, for display on a client device, a panoptic inpainting interface comprising a panoptic label element selectable to create a panoptic segmentation map for inpainting a digital image;
   receiving, from the client device, an indication of user interaction with the panoptic label element to define the panoptic segmentation map within the panoptic inpainting interface;
   determining, in response to an additional indication of user interaction with an image mask element, a binary mask for the digital image indicating pixels of the digital image to be inpainted; and
   providing, for display within the panoptic inpainting interface, an inpainted digital image generated utilizing a panoptic inpainting neural network based on receiving the indication of the user interaction to define the panoptic segmentation map and according to the binary mask.

2. The non-transitory computer readable medium of claim 1, wherein providing the panoptic inpainting interface comprises providing, for display together with the panoptic label element, an inpainting element selectable to generate the inpainted digital image utilizing the panoptic inpainting neural network.

3. The non-transitory computer readable medium of claim 1, further storing executable instructions which, when executed by the processing device, cause the processing device to perform operations comprising providing, for display within the panoptic inpainting interface in response to the indication of the user interaction with the panoptic label element, a panoptic segmentation map design window modifiable to define the panoptic segmentation map for the digital image.

4. The non-transitory computer readable medium of claim 1, wherein receiving the indication of the user interaction to define the panoptic segmentation map comprises receiving panoptic labels for regions of the digital image.

5. The non-transitory computer readable medium of claim 1, wherein receiving the indication of the user interaction to define the panoptic segmentation map comprises receiving indications of boundaries for regions of the digital image.

6. The non-transitory computer readable medium of claim 5, wherein receiving the indications of boundaries for regions of the digital image comprises receiving inputs to define the regions with different colors corresponding to respective panoptic labels and delineating the regions of the digital image.

7. The non-transitory computer readable medium of claim 1,
   wherein determining the binary mask for the digital image further comprises receiving, via one or more tools of the image mask element within the panoptic inpainting interface, an indication of pixels of the digital image to designate as the binary mask.

8. A system comprising:
   one or more memory devices comprising a panoptic inpainting neural network; and
   one or more processors configured to cause the system to provide a graphical user interface for implementing the panoptic inpainting neural network to generate an inpainted digital image by:
      providing, for display on a client device, a panoptic inpainting interface comprising a panoptic label element selectable to create a panoptic segmentation map for inpainting a digital image;

receiving, from the client device, a first indication of user interaction with the panoptic label element to define the panoptic segmentation map within the panoptic inpainting interface;

receiving, from the client device, a second indication of user interaction with an image mask element to define a binary mask for the digital image; and providing, for display within the panoptic inpainting interface, an inpainted digital image generated utilizing a panoptic inpainting neural network based on the first indication of user interaction and the second indication of user interaction.

9. The system of claim 8, wherein receiving the second indication of user interaction to define the binary mask comprises receiving, via the panoptic inpainting interface, an indication of pixels of the digital image to designate as pixels to be replaced by the panoptic inpainting neural network.

10. The system of claim 8, wherein receiving the first indication of the user interaction to define the panoptic segmentation map comprises:

receiving panoptic segmentation boundaries defining regions of the digital image within the panoptic inpainting interface; and receiving panoptic labels entered via the panoptic inpainting interface for the regions of the digital image.

11. The system of claim 8, wherein the one or more processors are further configured to cause the system to provide the graphical user interface for implementing the panoptic inpainting neural network to generate the inpainted digital image by providing, for display within the panoptic inpainting interface, a panoptic boundary drawing tool selectable to define panoptic regions of the digital image.

12. The system of claim 11, wherein receiving the first indication of the user interaction to define the panoptic segmentation map comprises receiving input strokes using the panoptic boundary drawing tool to define regions of the digital image.

13. The system of claim 12, wherein receiving the input strokes using the panoptic boundary drawing tool comprises receiving input strokes defining regions for panoptic labels associated with objects depicted within the digital image.

14. The system of claim 12, wherein receiving the input strokes using the panoptic boundary drawing tool comprises receiving input strokes defining regions for a panoptic label associated with an object not depicted within the digital image.

15. A computer-implemented method comprising:

providing, for display on a client device, a panoptic inpainting interface comprising a panoptic label element selectable to create a panoptic segmentation map for inpainting a digital image;

receiving, from the client device, an indication of user interaction with the panoptic label element to define the panoptic segmentation map within the panoptic inpainting interface;

determining, in response to an additional indication of user interaction with an image mask element, a binary mask for the digital image indicating pixels of the digital image to be inpainted; and providing, for display within the panoptic inpainting interface based on receiving the indication of the user interaction to define the panoptic segmentation map and the additional indication of the user interaction to define the binary mask, an inpainted digital image generated utilizing a panoptic inpainting neural network trained using a semantic discriminator for generating realistic digital images that conform to panoptic boundaries.

16. The computer-implemented method of claim 15, further comprising utilizing a segmentation neural network to determine different regions of the digital image.

17. The computer-implemented method of claim 16, wherein receiving the indication of the user interaction to define the panoptic segmentation map comprises receiving panoptic labels entered via the panoptic inpainting interface for the different regions of the digital image.

18. The computer-implemented method of claim 15, further comprising utilizing the panoptic inpainting neural network to generate the inpainted digital image by replacing pixels within a designated area of the digital image according to the panoptic segmentation map.

19. The computer-implemented method of claim 15, wherein receiving the indication of the user interaction to define the panoptic segmentation map comprises receiving panoptic segmentation boundaries defining regions of the digital image within the panoptic inpainting interface.

20. The computer-implemented method of claim 19, further comprising utilizing a segmentation neural network to determine panoptic labels for the regions of the digital image.

* * * * *